(12) United States Patent
Smith et al.

(10) Patent No.: US 12,468,001 B1
(45) Date of Patent: Nov. 11, 2025

(54) ANTENNA ARRANGEMENTS FOR MEASUREMENT OF ANGLE OF ARRIVAL OVER 360 DEGREES

(71) Applicant: SR Technologies, Inc., Sunrise, FL (US)

(72) Inventors: Graham K. Smith, Boca Raton, FL (US); Kyle Patrick Kelly, Palm Beach Gardens, FL (US); Mark Passler, Rockville, MD (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 19/244,838

(22) Filed: Jun. 20, 2025

Related U.S. Application Data

(60) Provisional application No. 63/662,714, filed on Jun. 21, 2024.

(51) Int. Cl.
   *G01S 3/28* (2006.01)
   *H01Q 21/06* (2006.01)

(52) U.S. Cl.
   CPC ............. *G01S 3/28* (2013.01); *H01Q 21/06* (2013.01)

(58) Field of Classification Search
   CPC .... G01S 13/4454; G01S 13/42; G01S 13/931; G01S 7/024; G01S 13/66; G01S 7/352; G01S 7/412; G01S 3/48; G01S 3/043; G01S 13/006; G01S 7/41; G01S 13/48
   See application file for complete search history.

(56) References Cited

U.S. PATENT DOCUMENTS

| | | | | |
|---|---|---|---|---|
| 2007/0135167 | A1* | 6/2007 | Liu | H01Q 3/2617 455/562.1 |
| 2007/0287385 | A1* | 12/2007 | Stephenne | H04B 7/08 455/562.1 |
| 2014/0159945 | A1* | 6/2014 | Chung | G01S 13/44 342/149 |
| 2019/0064312 | A1* | 2/2019 | Jeon | G01S 5/02521 |

\* cited by examiner

*Primary Examiner* — Olumide Ajibade Akonai
(74) *Attorney, Agent, or Firm* — Goodwin Procter LLP

(57) ABSTRACT

A method for determining an angle of arrival (AoA) of a radio frequency (RF) signal received at an antenna array. The method includes determining theoretical signals to be received at an antenna array having first and second antenna pairs. Antennas of the first antenna pair are offset from each other by a first offset angle and antennas of the second antenna pair are offset from each other by a second offset angle. A look-up table is generated based on the theoretical signals. An RF signal is received at each antenna pair and the antenna outputs in each antenna pair are combined to produce first and second difference values. The first and second difference values are compared to theoretical difference values in the look-up table. A measured AoA of the RF signal is determined based on the comparison of the first and second difference values to the theoretical difference values.

20 Claims, 16 Drawing Sheets

ANTENNA ARRANGEMENTS FOR MEASUREMENT OF ANGLE OF ARRIVAL OVER 360 DEGREES

CROSS-REFERENCE TO RELATED APPLICATIONS

This application claims priority to U.S. Provisional Application No. 63/662,714, filed on Jun. 21, 2024 and titled "ANTENNA ARRANGEMENTS FOR MEASUREMENT OF ANGLE OF ARRIVAL OVER 360 DEGREES," the entire disclosure of which is hereby incorporated by reference.

TECHNICAL FIELD

The present disclosure relates to wireless communications, and in particular, to systems and methods for determining an angle of arrival of a radio signal over a range of 360 degrees.

BACKGROUND

An angle of arrival (AoA) measurement is a method for determining the direction of propagation of a radio frequency (RF) wave incident on an antenna array. AoA determines the direction of the transmitted signal and, in the general sense, may be determined by measuring the difference in received phase between each element in an antenna array.

FIG. 1 depicts an example of a two element antenna array. Antenna A 10 and antenna B 11 are spaced apart by a distance D 13. An incoming incident RF signal 12 (shown as RF signals 12a and 12b) is received at antenna A 10 and at antenna B 11. The incoming RF signal 12 is arriving at an angle θ 14 relative to the plane of the two antennas 10 and 11. The RF signal 12b received at antenna B 11 has travelled a further distance d 15 than the RF signal 12a received at antenna A 10.

The distance d 15 travelled by the RF signal 12b is related to the distance between the antennas, D 13, and the angle of the arrival of the RF signal, θ 14; using simple geometry:

$$d = D \cos\theta \quad (1)$$

The phase difference ϕ between the RF signal received at antenna B 11 (i.e., RF signal 12b) and the RF signal received at antenna A 10 (i.e., RF signal 12a) is therefore:

$$\phi = 2\pi d/\lambda \text{ where } \lambda \text{ is the wavelength of the } RF \text{ signal.} \quad (2)$$

Hence, $\phi = 2\pi D \cos\theta/\lambda$ $\cos\theta = \phi \cdot \lambda/(2\pi D)$, or $$\theta = A \cos(\phi \cdot \lambda/(2\pi D)) \quad (3)$$

The phase difference ϕ between the RF signal received at each of the antennas 10, 11 is therefore related to the AoA θ 14 of the RF signal 12. For example, if the RF signal 12 is coming from a direction directly in front of the two antennas 10, 11, then θ=90° (or π/2 radians) and ϕ=0° (or 0 radians).

A common method to measure the phase difference ϕ is to add the signals from both antennas as depicted in FIG. 2. The output from each antenna 10 and 11 is connected to the inputs of an RF adder 21 which provides the sum signal 22 of the two signals at its output.

If the received signals at antennas 10 and 11 have amplitude S, then the sum signal 22 of the RF adder 21, using simple trigonometry, is:

$$\text{Sum} = S\sqrt{2 + 2\cos\phi} \quad (4)$$

If the distance D 13 between the antennas 10 and 11 is arranged to be half a wavelength, D=λ/2, then when the RF signal is coming from a direction from the side of the antennas 10, 11, θ=0, the two RF signals from the two antennas will be in anti-phase and will cancel out and the result of the summation will be an RF signal of zero amplitude. When the RF signal is coming from the front of the two antennas, θ=π/2, then the two RF signals will add in phase and the result of the summation will be an RF signal at the maximum amplitude. FIG. 3 shows an example graphical representation 30 of the amplitude of the RF sum signal 22 at the output of the RF adder 21 as the angle of arrival varies from 0 to 180 degrees.

One method to measure the AoA is to rotate the two antennas 10, 11 around their axis such that the sum of the received signals is at a maximum and hence the direction of the incident wave is known. The accuracy of this approach can be increased by using two directional antennas or by increasing the distance between the two antennas 10, 11 which results in a narrower front beam width but also results in more than one maximum. Another method is to derive the difference between the two antennas 10 and 11. If the received signals at antennas 10 and 11 have amplitude S, the difference, using simple trigonometry, is:

$$\text{Difference} = S\sqrt{2 - 2\cos\phi} \quad (5)$$

FIG. 4 is an example graphical representation showing the sum 30 and the difference 40 of the incident wave received at the two antennas 10 and 11 when the two antennas are spaced D=λ/2. At an angle of arrival of 90° (indicated by reference 45), the difference 40 is at a sharp minimum. A method to measure the AoA is to rotate the two antennas 10, 11 around their axis such that the difference of the received signals is at a minimum and hence the direction of the incident wave is known. A disadvantage of this approach is that the antenna assembly needs to be rotated.

The amplitudes of the sum and difference signals are proportional to the received signal level at the antennas 10, 11 and therefore their values cannot be used to derive the AoA directly without also determining the received signal strength.

FIG. 5 is a block diagram depicting an example system where the sum and difference amplitudes are produced and then the ratio between the two is derived. The output from each antenna 10 and 11 is connected to the inputs of an RF adder 21 which provides the sum signal 22 of the two signals from antennas 10 and 11 at its output, as also depicted in FIG. 2. The output from each antenna 10 and 11 is also connected to the inputs of an RF subtractor 51 which provides the difference signal 52 of the two signals from antennas 10 and 11 at its output. The ratio of the sum signal 22 and the difference signal 52 is then derived in block 53. The ratio of the sum and difference signals 54 is then outputted from block 53. If the received signals at antennas 10 and 11 have amplitude S, then from equations (4) and (5), the ratio signal 54 is calculated as:

$$\text{Sum/Difference} = \frac{\sqrt{2}S\sqrt{1+\cos\phi}}{\sqrt{2}S\sqrt{1-\cos\phi}} \quad (6)$$

$$\text{Sum/Difference} = \frac{\sqrt{1+\cos\phi}}{\sqrt{1-\cos\phi}} \quad (7)$$

Note that the ratio formula shown in equation (7) is independent of the amplitude S of the incident signal. If the sum and difference signals are independently measured and expressed in dBm, then the ratio is the difference between the two.

FIG. 6 is an example graphical representation of the sum signal 62, the difference signal 64, and the ratio 65 when the two antennas A 10 and B 11 are spaced D=λ/2 and the signal strengths are expressed in dBm. A received signal level of −70 dBm is assumed and a noise floor of −100 dBm. The sum 62 and difference 64 signals are plotted in dBm and the ratio 65, the difference between them, is plotted in dB. Given the ratio, in dB, is independent of the received signal level S, its value may be used to directly look up the AoA. However, when D=λ/2, there are two possible AOAs for every value of the ratio.

SUMMARY

In various examples, the subject matter described herein relates to wireless communications, and in particular, to systems and methods for determining an angle of arrival (AoA) of a radio signal over a range of 360 degrees. According to some embodiments, a method for determining an AoA of a radio frequency (RF) signal received at an antenna array includes determining a plurality of theoretical signals to be received at an antenna array having at least a first antenna pair and a second antenna pair, wherein antennas of the first antenna pair are offset from each other by a first offset angle and antennas of the second antenna pair are offset from each other by a second offset angle. An AoA look-up table is generated for the antenna array based on a plurality of theoretical signals. An RF signal is received at each pair of antennas of the antenna array and the outputs of the antennas in each antenna pair are combined to produce first sum and difference signals for the first antenna pair and second sum and difference signals for the second antenna pair. A first difference value is calculated corresponding to a signal level difference between the first sum signal and the first difference signal. A second difference value is calculated corresponding to a signal level difference between the second sum signal and the second difference signal. The first and second difference values are compared to theoretical difference values in the AoA look-up table, wherein the theoretical difference values correspond to different AoAs. A measured AoA of the RF signal is determined based on the comparison of the first and second difference values to the theoretical difference values.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

Figure (FIG. 1 illustrates a two element antenna array, in accordance with some embodiments.

DETAILED DESCRIPTION

This disclosure relates to the discrimination of signal angle of arrival (AoA) using sum and difference ratios. In particular, to the discrimination of signal AoA using a sum and difference ratio of two pairs of antennas that are offset from each other.

It is common practice for a radio-frequency (RF) receiver to measure the received signal strength of an RF input signal. This value is commonly referred to as the received signal strength indicator (RSSI) and is usually expressed in dBm. Hence, the measurement of the amplitudes of the sum and difference signals may be performed by RF receivers.

There are several methods for taking the ratio of the sum and difference signals produced by combining the outputs from two antennas. For example, in one embodiment, the 'sum' signal is the addition of the output signal from antenna A 10 shifted by zero degrees and the output signal from antenna B 11 shifted by zero degrees. Similarly, the 'difference' signal is the addition of the output signal from antenna A 10 shifted by zero degrees and the output signal from antenna B 11 shifted by 180 degrees. In another embodiment, the 'difference' signal is produced by the addition of the output signal from antenna A 10 shifted by 90 degrees, and the output signal from antenna B 11 shifted by −90 degrees. In fact, any symmetrical and opposite shifting of the antenna output signals can be used, but optimum results may be achieved when the shifts are in increments of 90, 180 or 270 degrees. In one embodiment, having full symmetry, the 'sum' signal is the addition of the output signal from antenna A 10 shifted by 90 degrees and the output signal from antenna B 11 shifted by zero degrees, and the 'difference' signal is the addition of the output signal from antenna A 10 shifted by zero degrees and the output signal from antenna B 11 shifted by 90 degrees. To keep the differential losses and phases of the combining circuitry to a minimum, the signal paths from antennas A 10 and B 11 to RF adder 21 and RF subtractor 51 should be of equal length, as should the signal paths from RF adder 21 and RF subtractor 51 to block 53. Likewise, substantially identical combining elements in each signal path should be used.

Figure 7:
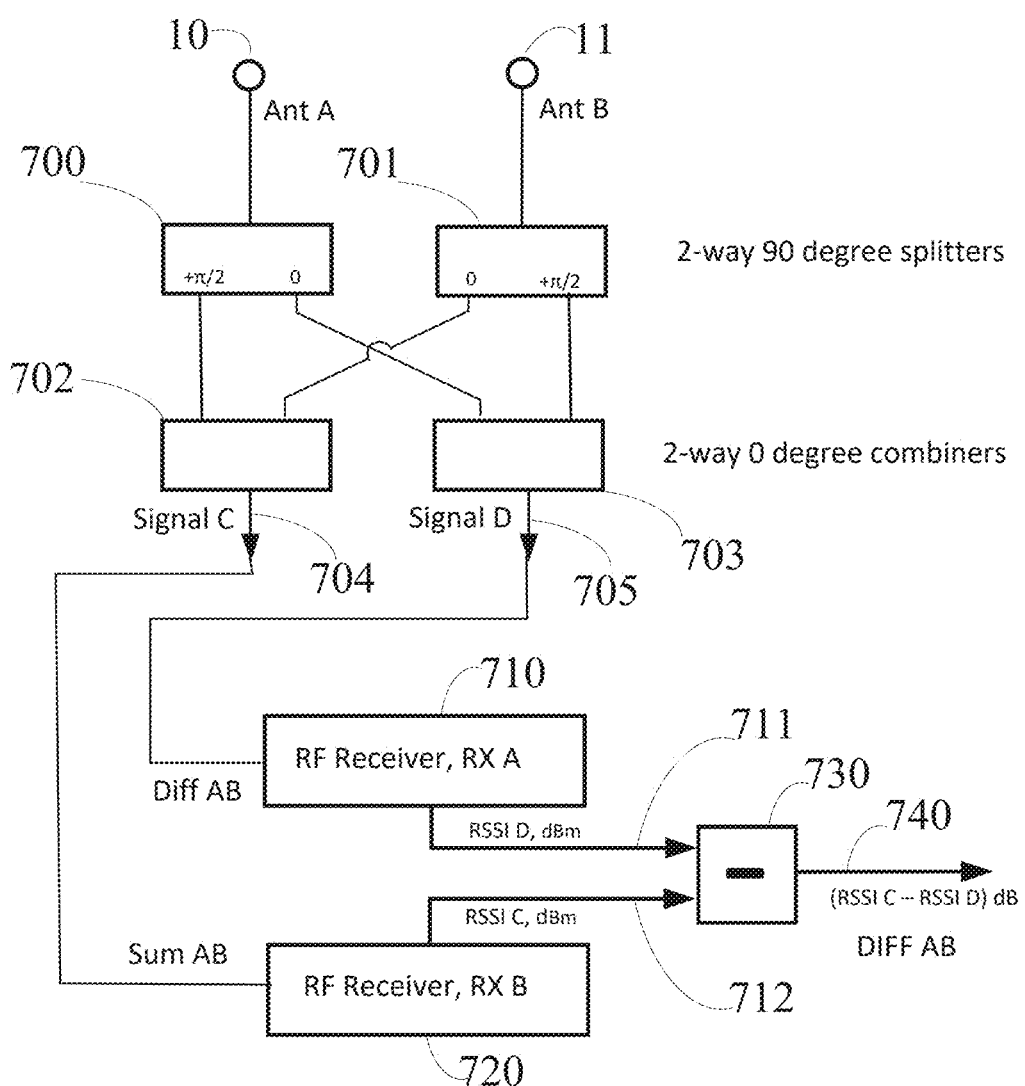
FIG. 7 a block diagram illustrating an exemplary implementation with common combining elements used in each signal path, in accordance with some embodiments.

FIG. 7 is a diagram depicting an exemplary implementation with common combining elements used in each signal path. The signals from antenna A 10 and antenna B 11 are each applied to the input of a 2-way 90 degree splitter, 700 and 701 respectively. The +90 degree (or π/2 radians) output from splitter 700 is connected to one input of a 2-way 0 degree combiner 702. Similarly, the +90 degree (or π/2 radians) output from splitter 701 is connected to one input of a 2-way 0 degree combiner 703. The 0 degree output from splitter 700 is connected to the other input of combiner 703, whereas the 0 degree output from splitter 701 is connected to the other input of combiner 702. Hence, the signal C 704, sum AB, at the output of combiner 702 is the sum of the signal from antenna A 10 shifted by +90 degrees and the signal from antenna B 11 shifted by 0 degrees. Similarly, signal D 705, diff AB, at the output of combiner 703 is the sum of the signal from antenna A 10 shifted by 0 degrees and the signal from antenna B 11 shifted by +90 degrees. Signal C 704, sum AB, is input to RF receiver RX B 720 and signal D 705, diff AB, is input to RF receiver RX A 710. The RSSI 712 for signal C 704 is measured and outputted by RF receiver 720, whereas the RSSI 711 for signal D 705 is measured and outputted by RF receiver 710. In block 730, the two RSSI values are subtracted to produce a value DIFF AB 740. In practice, the subtraction carried out in block 730 may be an operation carried out by a processor or processor circuitry including a processor and memory (e.g., such as of the types described herein). 2-way 90 degree splitters are standard RF components and are well known, and similarly 2-way 0 degree RF combiners are also standard RF components and are well known. As such, these components may be fabricated on a printed circuit board, be components soldered or mounted on a printed circuit board, or be coaxial devices connected by RF cables. In FIG. 7, the lengths of the four RF connections between the splitters and the combiners are generally set to be of equal length so as to make the losses and phases symmetrical.

The signals C 704 and D 705 are different from the sum and difference values previously shown and described. In this case, the relevant equations are:

$$\text{Signal } C, \text{ sum } AB = S\sqrt{2 + 2\sin\phi} \quad (8)$$

$$\text{Signal } D, \text{ diff } AB = S\sqrt{2 - 2\sin\phi} \quad (9)$$

$$\text{Ratio } C/D = \frac{\sqrt{1 + \sin\phi}}{\sqrt{1 + \sin\phi}} \quad (10)$$

In the following descriptions, the signal that corresponds to the (1+sin φ) term is referred to as the "sum" and the signal that corresponds to the (1−sin φ) term is referred to as the "difference" or "diff".

Figure 1:
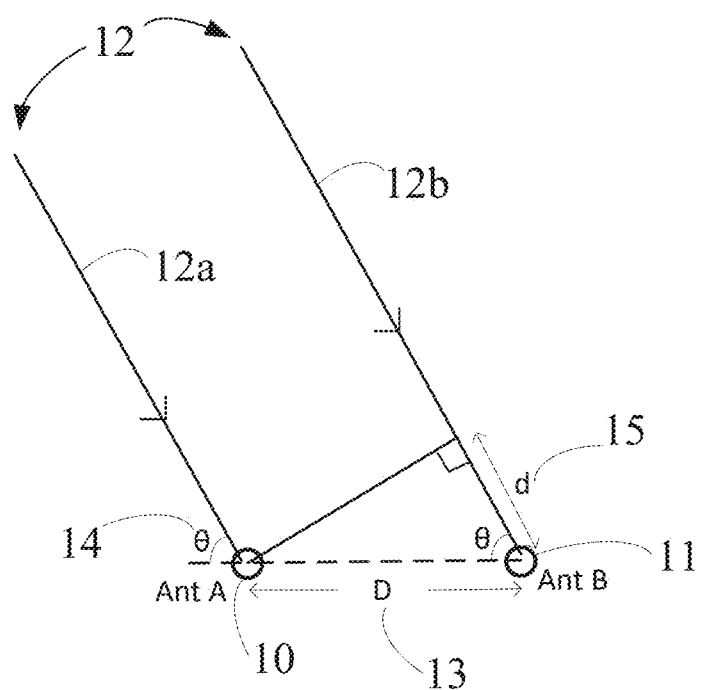
Figure 2:
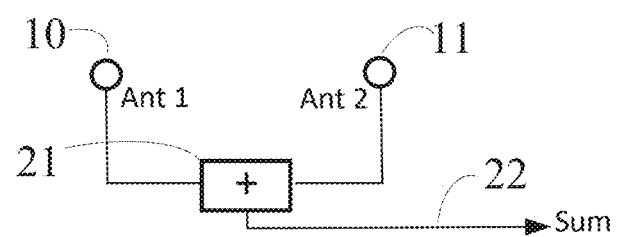
FIG. 2 illustrates a method to measure the phase difference of the signals from the antennas of the antenna array of FIG. 1, in accordance with some embodiments.
Figure 3:
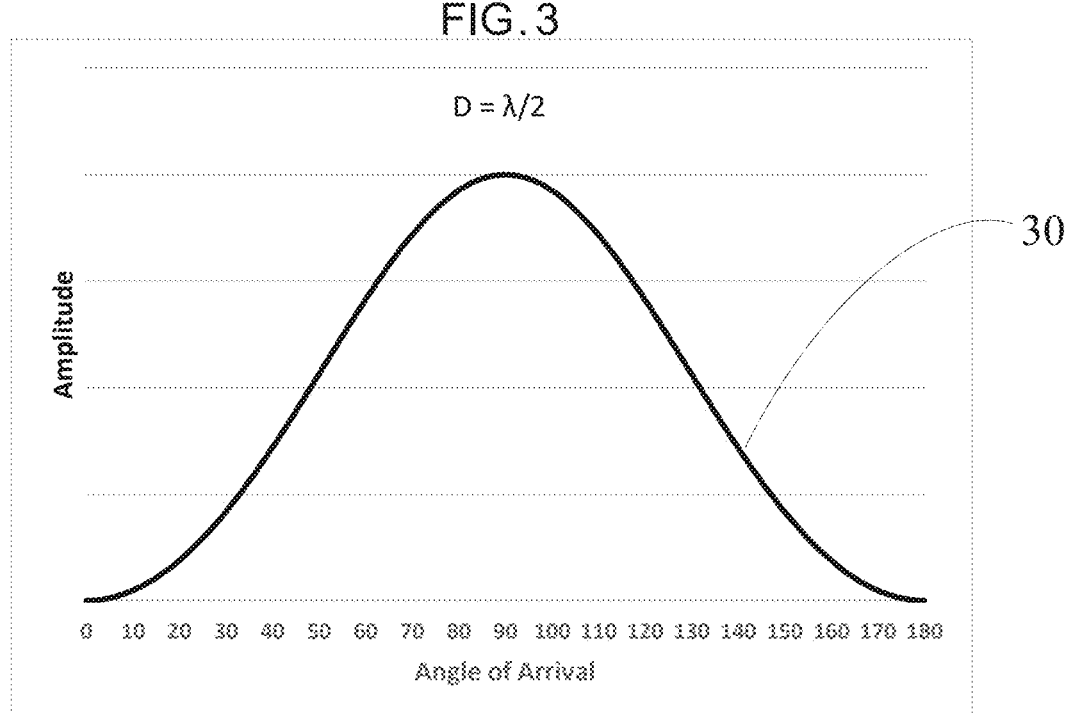
FIG. 3 illustrates a graphical representation of the amplitude of a radio frequency (RF) sum signal at an output of the RF adder, in accordance with some embodiments.
Figure 4:
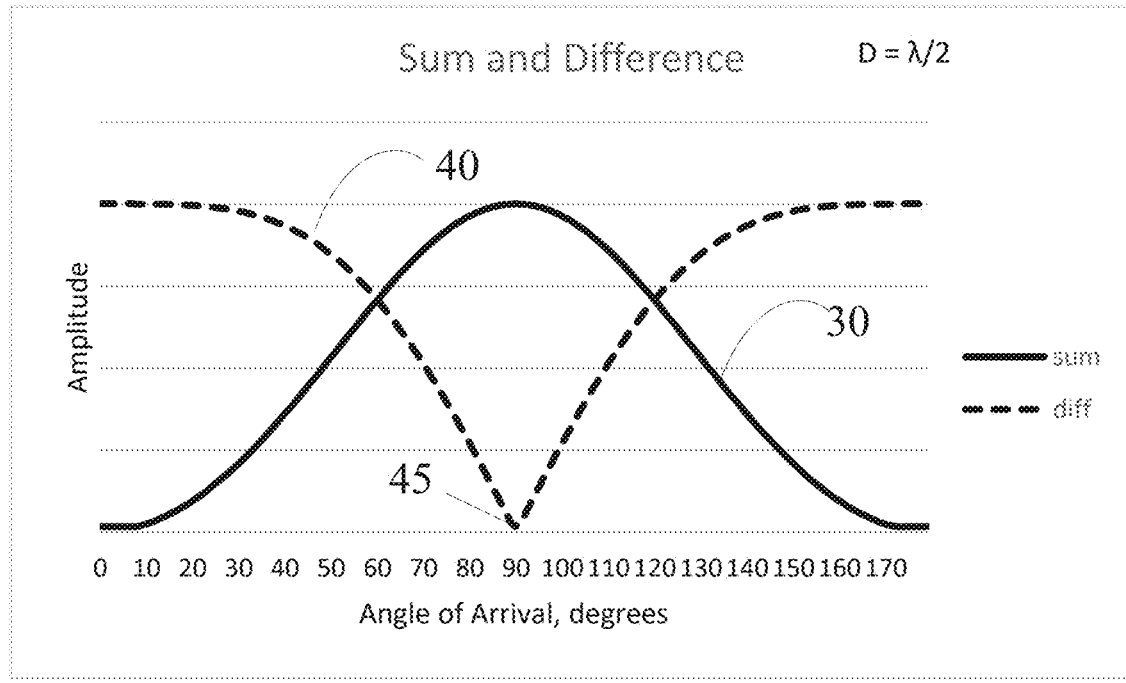
FIG. 4 illustrates a graphical representation of the sum and the difference of an incident wave received at two antennas of an antenna array, in accordance with some embodiments.
Figure 5:
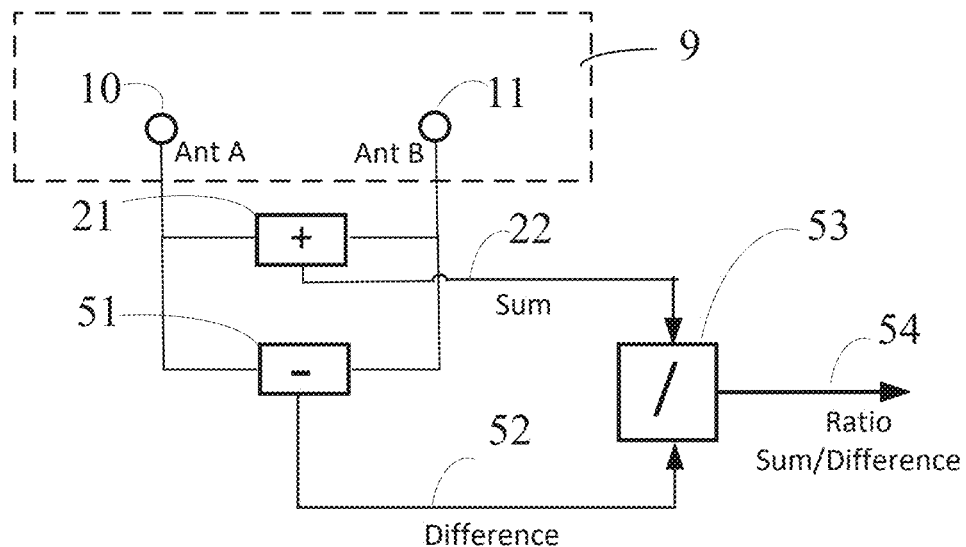
FIG. 5 is a block diagram illustrating a system that produces sum and difference amplitudes, and derives a ratio between them, in accordance with some embodiments.
Figure 8:
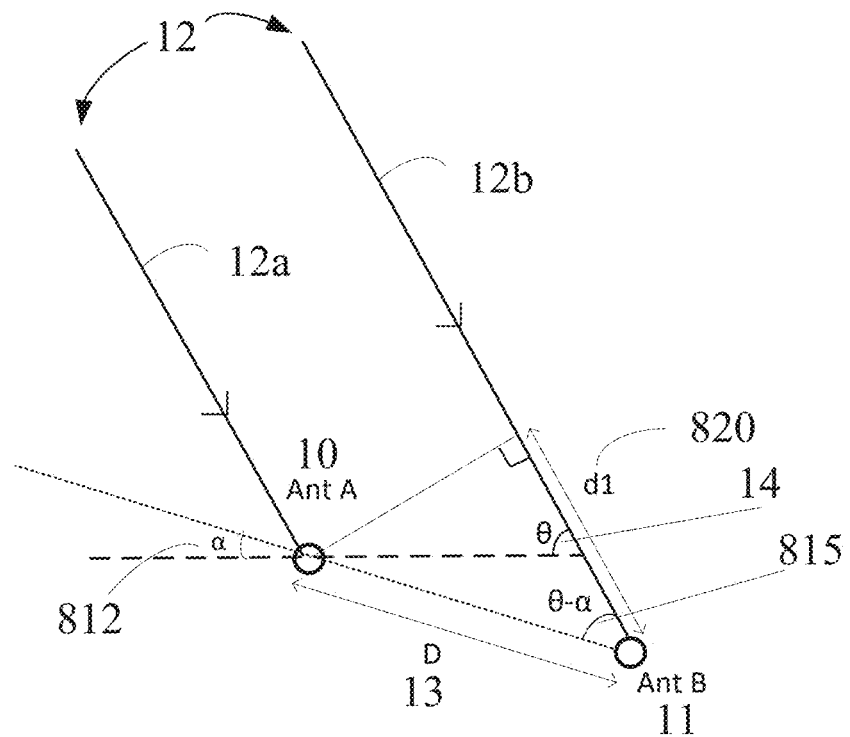
FIG. 8 illustrates a two element antenna array that is offset to the incident RF signal horizontal plane by a positive angle, in accordance with some embodiments.

FIG. 8 depicts an example of two element antenna array. The antenna array of FIG. 8 is similar to the antenna array depicted in FIG. 1, however antenna A 10 and antenna B 11 are spaced apart by a distance D 13 and the pair are offset by an angle α 812 relative to the horizontal plane. An incident RF signal 12 (shown as RF signals 12a and 12b) is received at antenna A 10 and at antenna B 11. The incident RF signal 12 is arriving at an angle θ 14 incident to the horizontal plane. In the depicted example, the RF signal 12b received at antenna B 11 has travelled further than the RF signal 12a received at antenna A 10 by a distance d1 820.

The extra distance travelled by the RF signal, d1 820, is related to the distance between the antennas, D 13, the angle of the arrival of the RF signal, θ 14, and the offset angle α 812, as shown in equation (11):

$$d1 = D\cos(\theta - \alpha) \quad (11)$$

The phase difference φ1 between the RF signal received at antenna B 11 (i.e., RF signal 12b) and the RF signal received at antenna A 10 (i.e., RF signal 12a) is:

φ₁=2πd1/λ where λ is the wavelength of the RF signal, $$\phi_1 = 2\pi D \cos(\theta - \alpha)/\lambda \quad (12)$$

Figure 9:
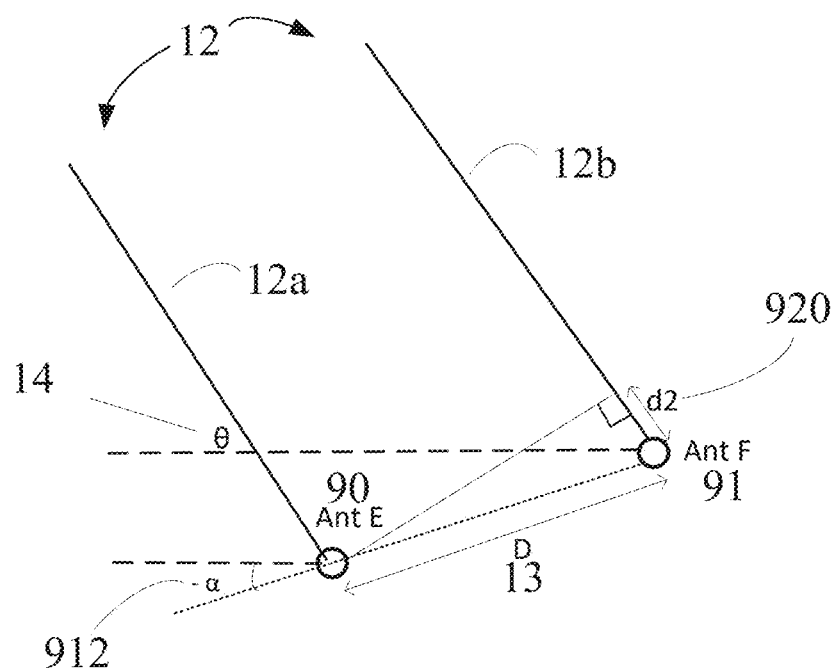
FIG. 9 illustrates a two element antenna array, that is offset to the incident RF signal horizontal plane by a negative angle, in accordance with some embodiments.

FIG. 9 depicts an example two element array similar to that depicted in FIG. 8. In FIG. 9, antenna E 90 and antenna F 91 are also spaced apart by a distance D 13, however the pair are offset by an angle −α 912. An incident RF signal 12

(shown as RF signals 12a and 12b) is received at antenna E 90 and at antenna F 91. As also shown in FIG. 8, the incident RF signal 12 is arriving at an angle θ 14 incident to the horizontal plane. In the depicted example, the RF signal 12b received at antenna F 91 has travelled further than the RF signal 12a received at antenna E 90 by a distance d2 920.

The extra distance travelled by the RF signal, d2 920, is related to the horizontal distance between the antennas, D 13, the angle of the arrival of the RF signal, θ 14, and the offset angle-a 912, as shown in equation (13):

$$d2 = D \cos(\theta + a) \quad (13)$$

The phase difference $\phi_2$ between the RF signal received at antenna F 91 (i.e., RF signal 12b) and the RF signal received at antenna E 90 (i.e., RF signal 12a) is:

$\phi_2 = 2\pi d2/\lambda$ where $\lambda$ is the wavelength of the RF signal, $$\phi_2 = 2\pi D \cos(\theta + \alpha)/\lambda \quad (14)$$

Figure 10:
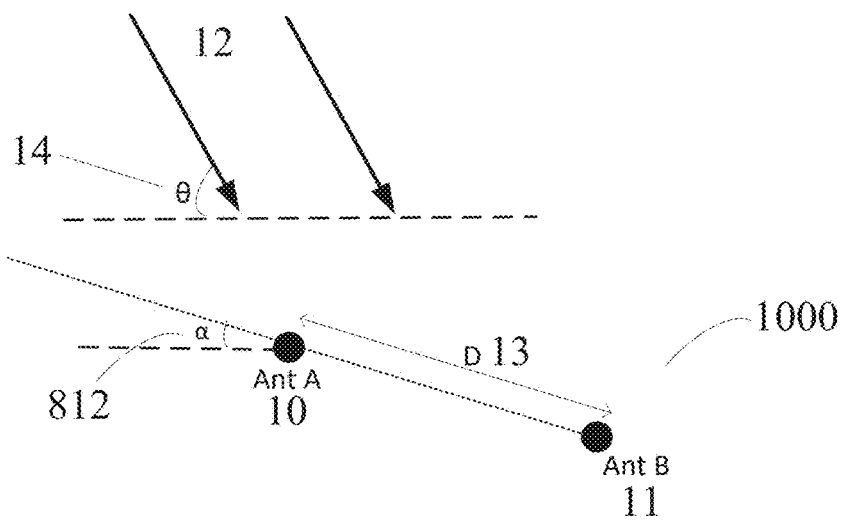
FIG. 10 illustrates a four element antenna array, in accordance with some embodiments.
Figure 10:
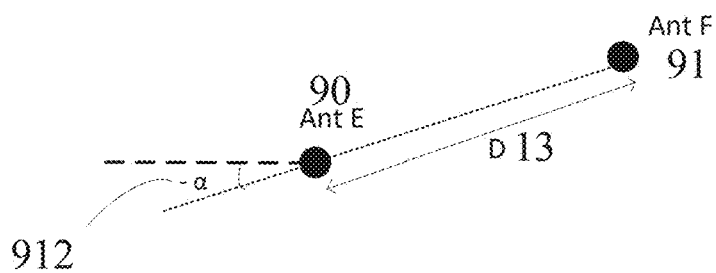
Figure 11:
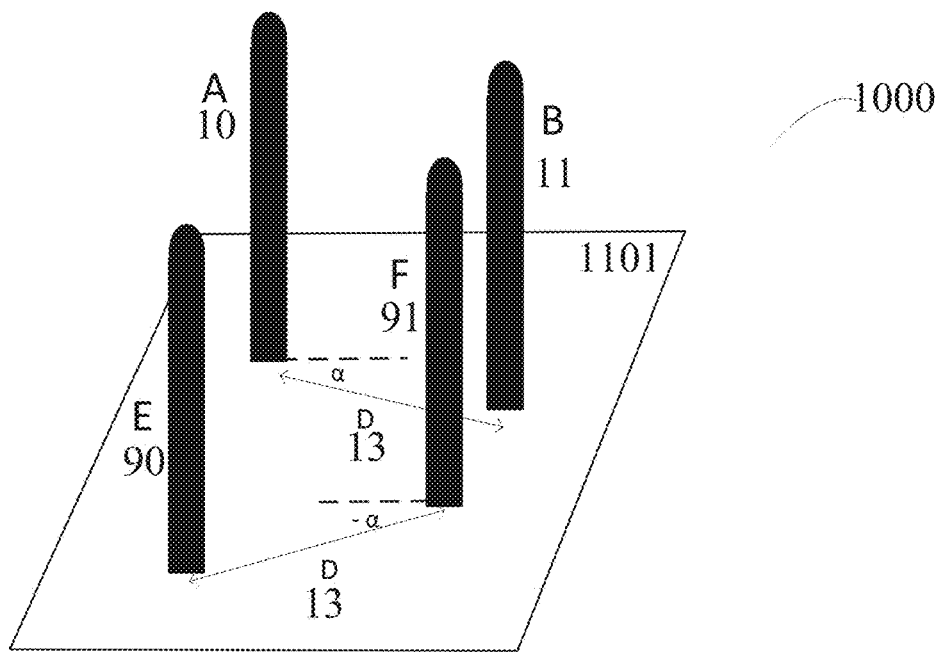
FIG. 11 illustrates an exemplary spatial arrangement of the four element antenna array of FIG. 10, in accordance with some embodiments.

FIG. 10 is an example of an antenna array 1000 comprising antennas A 10, B 11, E 90, and F 91. Antennas A 10 and B 11 are separated by distance D 13 and have an offset angle α 812. Antennas E 90 and F 91 are also separated by distance D 13 and have an offset angle-a 912. The incident RF signal 12 with wavelength A is at an angle θ 14. FIG. 11 is a schematic of an example of the antenna array 1000 where antennas A 10, B 11, E 90, and F 91 are vertical antennas above a horizontal ground plane 1101.

Figure 12:
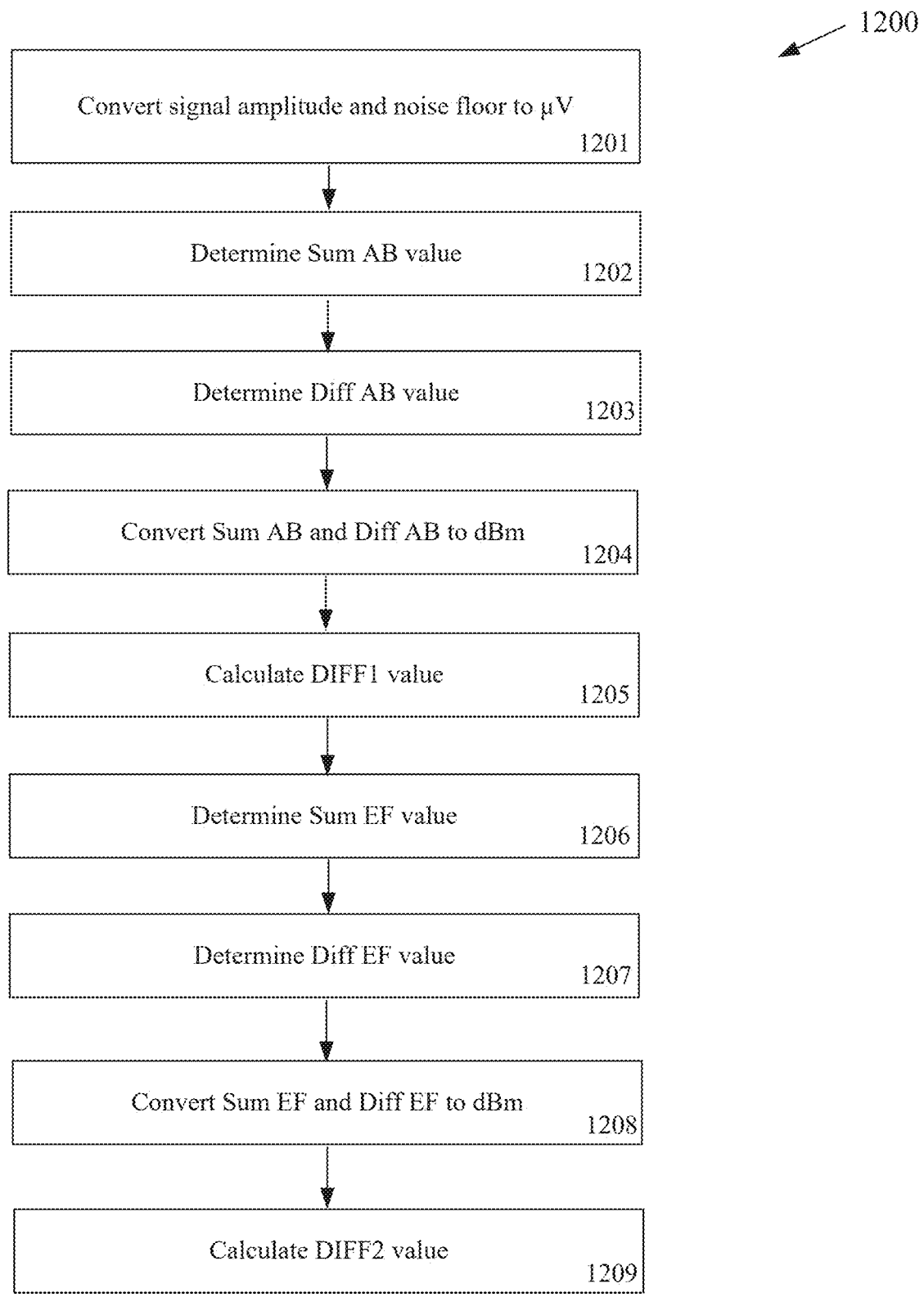
FIG. 12 is a flowchart illustrating a process for determining difference values for an antenna array, in accordance with some embodiments.

FIG. 12 is a flowchart of a process 1200 for determining difference values for the antenna array 1000. In some examples, the difference values for the antenna array 1000 are determined using a received signal amplitude of S dBm and a noise floor of n dBm.

At step 1201, the received signal amplitude and noise floor are converted to u V:

$$S_{\mu}V = \sqrt{10^{\left(\frac{SdBm}{10}\right)} \cdot 10^9 \cdot 50} \quad \eta_{\mu}v = \sqrt{10^{\left(\frac{\eta dBm}{10}\right)} \cdot 10^9 \cdot 50}$$

At step 1202, the Sum AB value is determined for antenna pair AB using equations (8) and (12), as shown below:

$$\Phi_1 = 2\pi D \cos(\theta - \alpha)/\lambda$$

$$\text{Sum } AB_{\mu V} = S_{\mu V}\sqrt{2 + 2\sin \phi_1}$$

The Sum $AB_{\mu V}$ value cannot be less than the noise floor $\eta_\mu v$. If the calculated value of Sum $AB_{\mu V}$ is less than the noise floor $\eta_{\mu V}$, then the calculated value of Sum $AB_{\mu V}$ is replaced with the value of the noise floor $\eta_{\mu V}$ (i.e., Sum $AB_{\mu V}=\eta_{\mu V}$).

At step 1203, the Diff AB value is determined for antenna pair AB using equation (9), as shown below:

$$\text{Diff } AB_{\mu V} = S_{\mu V}\sqrt{2 - 2\sin \phi_1}$$

The Diff $AB_{\mu V}$ value cannot be less the noise floor $\eta_{\mu V}$. If the calculated value of Diff ABμVis less than the noise floor $\eta_{\mu V}$, then the calculated value of Diff $AB_{\mu V}$ is replaced with the value of the noise floor $\eta_{\mu V}$ (i.e., Diff $AB_{\mu V}$=Nuv).

At step 1204, the Sum $AB_{\mu V}$ and Diff $AB_{\mu V}$ values are converted from u V to dBm and rounded as shown below:

$$\text{Sum } AB_{dBm} = \text{floor}\left(10 \log\left(\frac{\text{Sum } AB_{\mu V}^2 \cdot 10^{-9}}{50}\right)\right)$$

$$\text{Diff } AB_{dBm} = \text{floor}\left(10 \log\left(\frac{\text{Diff } AB_{\mu V}^2 \cdot 10^{-9}}{50}\right)\right)$$

At step 1205, the DIFF1 value for the AB antenna pair is calculated using equation (15):

$$\text{DIFF1}=\text{DIFF } AB=\text{Sum } AB_{dBm}-\text{Diff } AB_{dBm} \quad (15)$$

At step 1206, the Sum EF value is determined for antenna pair EF using equations (8) and (14), as shown below:

$$\phi_2 = 2\pi D \cos(\theta + \alpha)/\lambda$$

$$\text{Sum } EF_{\mu V} = S_{\mu V}\sqrt{2 + 2\sin \phi_2}$$

The Sum $EF_{\mu V}$ value cannot be less than the noise floor $\eta_{\mu V}$. If the calculated value of Sum $EF_{\mu V}$ is less than the noise floor $\eta_{\mu V}$, then the calculated value of Sum $EF_{\mu V}$ is replaced with the value of the noise floor $\eta_{\mu V}$ (i.e., Sum $EFuV=\eta_{\mu V}$).

At step 1207, the Diff EF value is determined for antenna pair EF using equation (9), as shown below:

$$\text{Diff } EF_{\mu V} = S_{\mu V}\sqrt{2 - 2\sin \phi_2}$$

The Diff $EF_{\mu V}$ value cannot be less than the noise floor $\eta_{\mu V}$. If the calculated value of Diff $EF_{\mu V}$ is less than the noise floor $\eta_{\mu V}$, then the calculated value of Diff $EF_{\mu V}$ is replaced with the value of the noise floor $\eta_{\mu V}$ (i.e., Diff $EF_{\mu V}=\eta_{\mu V}$).

At step 1208, the Sum $EF_{\mu V}$ and Diff $EF_{\mu V}$ values are converted from u V to dBm and rounded as shown below:

$$\text{Sum } EF_{dBm} = \text{floor}\left(10 \log\left(\frac{\text{Sum } AB_{\mu V}^2 \cdot 10^{-9}}{50}\right)\right)$$

$$\text{Diff } EF_{dBm} = \text{floor}\left(10 \log\left(\frac{\text{Diff } AB_{\mu V}^2 \cdot 10^{-9}}{50}\right)\right)$$

At step 1209, the DIFF2 value for the EF antenna pair is calculated using equation (16):

$$\text{DIFF2}=\text{DIFF } EF=\text{Sum } EF_{dBm}-\text{Diff } EF_{dBm} \quad (16)$$

Hence, for each AoA, there are two values: DIFF1 from antenna pair AB and DIFF2 from antenna pair EF. If the dimensions of the antenna array 1000, as depicted in FIGS. 10 and 11, are set such that the set of values for DIFF1 and DIFF2 are unique for each AoA, then a look-up table can be constructed that is used to directly read the AoA from the measured DIFF1 and DIFF2 values.

Figure 13:
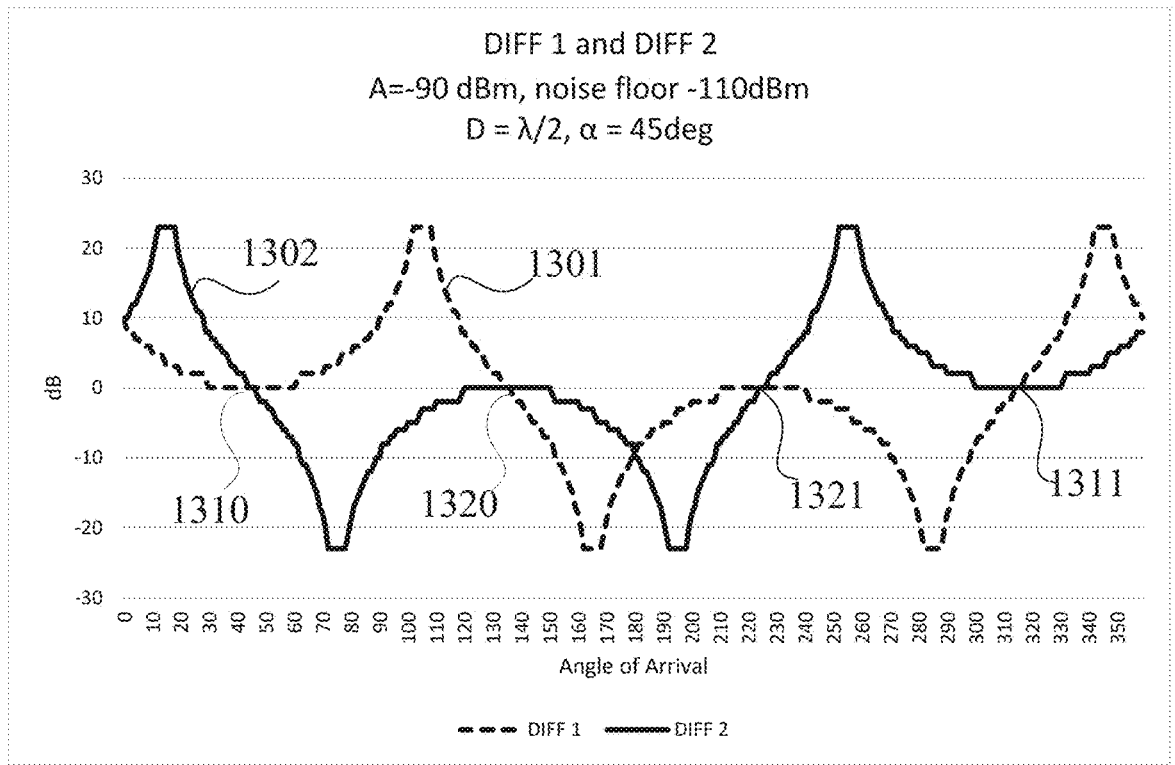
FIG. 13 illustrates a graphical representation of difference values for an antenna array plotted against angle of arrival (AoA) values, in accordance with some embodiments.

FIG. 13 is a graphical representation of examples of the DIFF1 1301 and DIFF2 1302 values plotted against AoA, 0 to 359 degrees, for the antenna array 1000. In the graphical representation of FIG. 13, the separation of the two antennas A 10 and B 11, and E 90 and F 91, is one half wavelength, D=λ/2, and the offset angle is α=45 degrees. The amplitude of the incident signal S=−90 dBm and the noise floor n=−110 dBm. As shown, there are four crossover points 1310, 1311, 1320, and 1321 which indicate that the AOAs at these points would not be unique.

Figure 14:
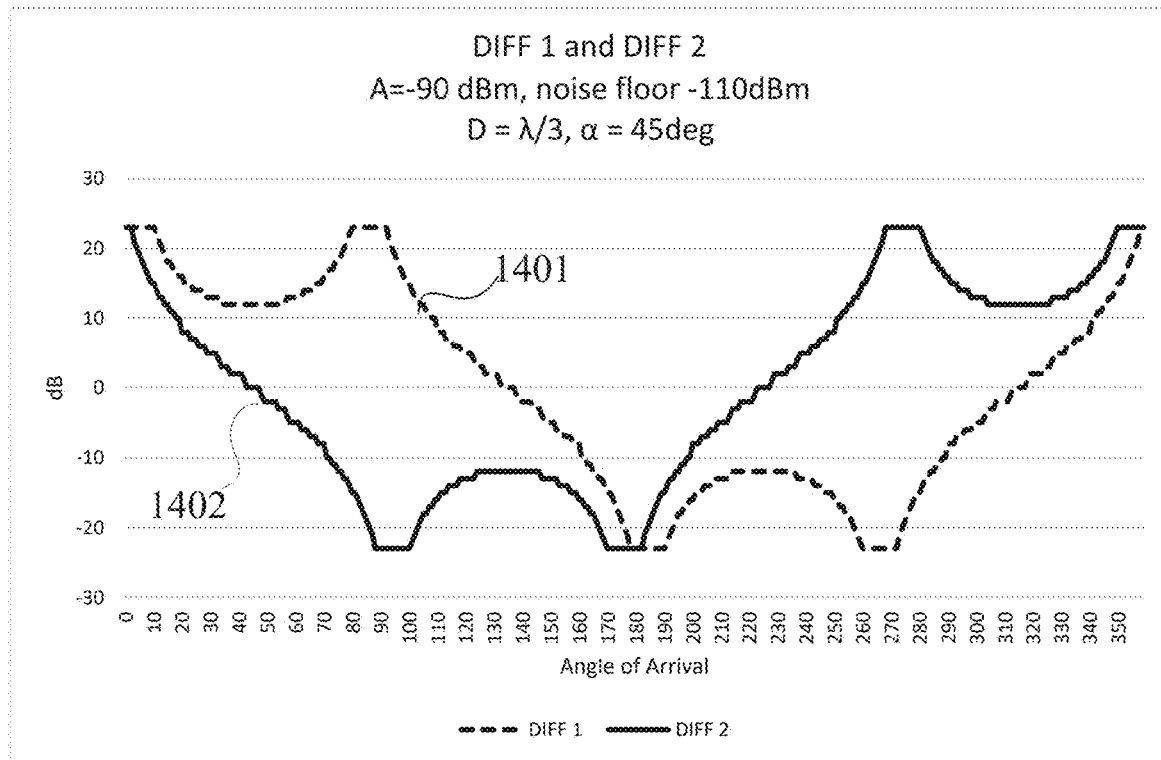
FIG. 14 illustrates a graphical representation of difference values for an antenna array plotted against AoA values, in accordance with some embodiments.

FIG. 14 is a graphical representation of examples of the DIFF1 1401 and DIFF2 1402 values plotted against AoA, 0 to 359 degrees, for the antenna array 1000. In the graphical representation of FIG. 14, the separation of the two antennas A 10 and B 11, and E 90 and F 91, is one third wavelength, D=$\lambda$/3, and the offset angle is $\alpha$=45 degrees. The amplitude of the incident signal S=−90 dBm and the noise floor n=−110 dBm. As shown, there are no crossover points, hence this arrangement may be further analyzed for uniqueness of the DIFF1 and DIFF2 pairs against AoA.

Figure 15:
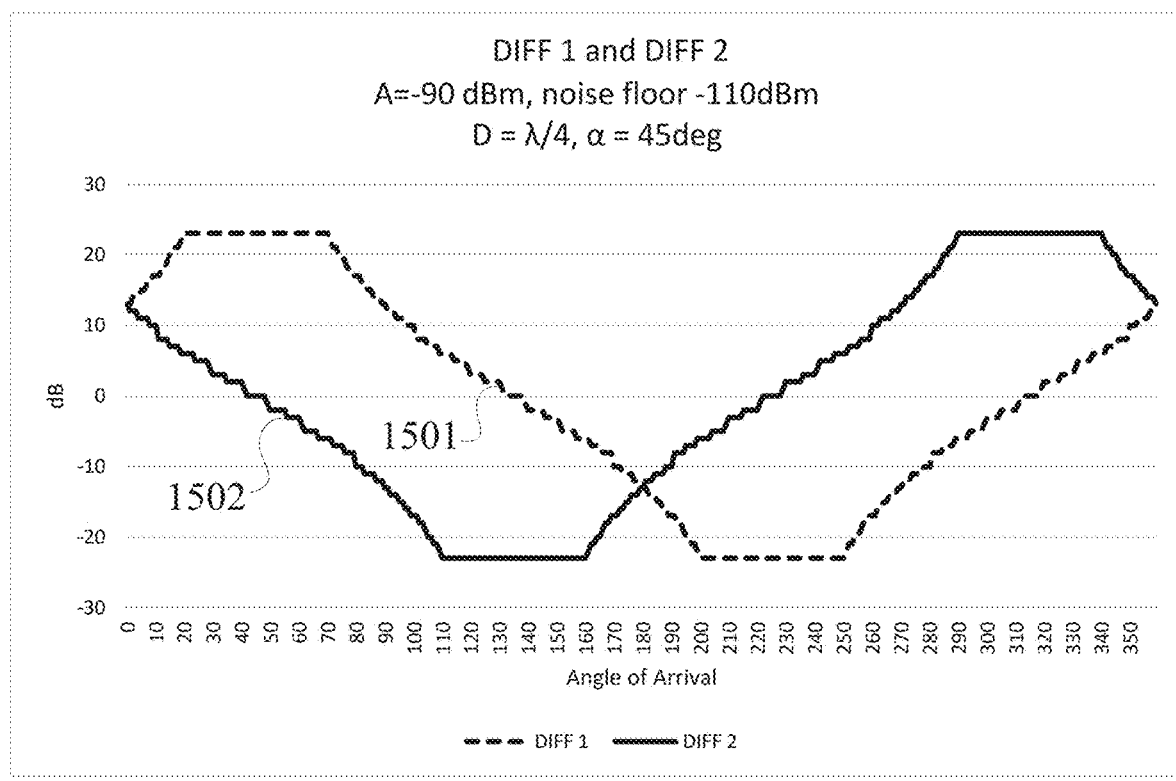
FIG. 15 illustrates a graphical representation of difference values for an antenna array plotted against AoA values, in accordance with some embodiments.

FIG. 15 is a graphical representation of examples of the DIFF1 1501 and DIFF2 1502 values plotted against AoA, 0 to 359 degrees, for the antenna array 1000. The graphical representation of FIG. 15, the separation of the two antennas A 10 and B 11, and E 90 and F 91, is one quarter wavelength, D=$\lambda$/4, and the offset angle is $\alpha$=45 degrees. The amplitude of the incident signal S=−90 dBm and the noise floor n=−110 dBm. Similar to FIG. 14, there are no crossover points, hence this arrangement may also be further analyzed for uniqueness of the DIFF1 and DIFF2 pairs against AoA.

Comparing the DIFF1 and DIFF2 values in FIGS. 14 and 15, the slopes of DIFF1 1401 and DIFF2 1402 are greater than the slopes of DIFF1 1501 and DIFF2 1502. To reduce any interaction between the antenna fields, it is beneficial to have the distance between the antennas of each pair AB and EF as large as possible. Hence, generally, it may be preferred for D to be set to $\lambda$/3 rather than $\lambda$/4.

A more complete understanding of the present embodiments, and the attendant advantages and features thereof, will be more readily understood by considering a scenario simulation where the AoA is measured using DIFF1 and DIFF2.

Figure 16:
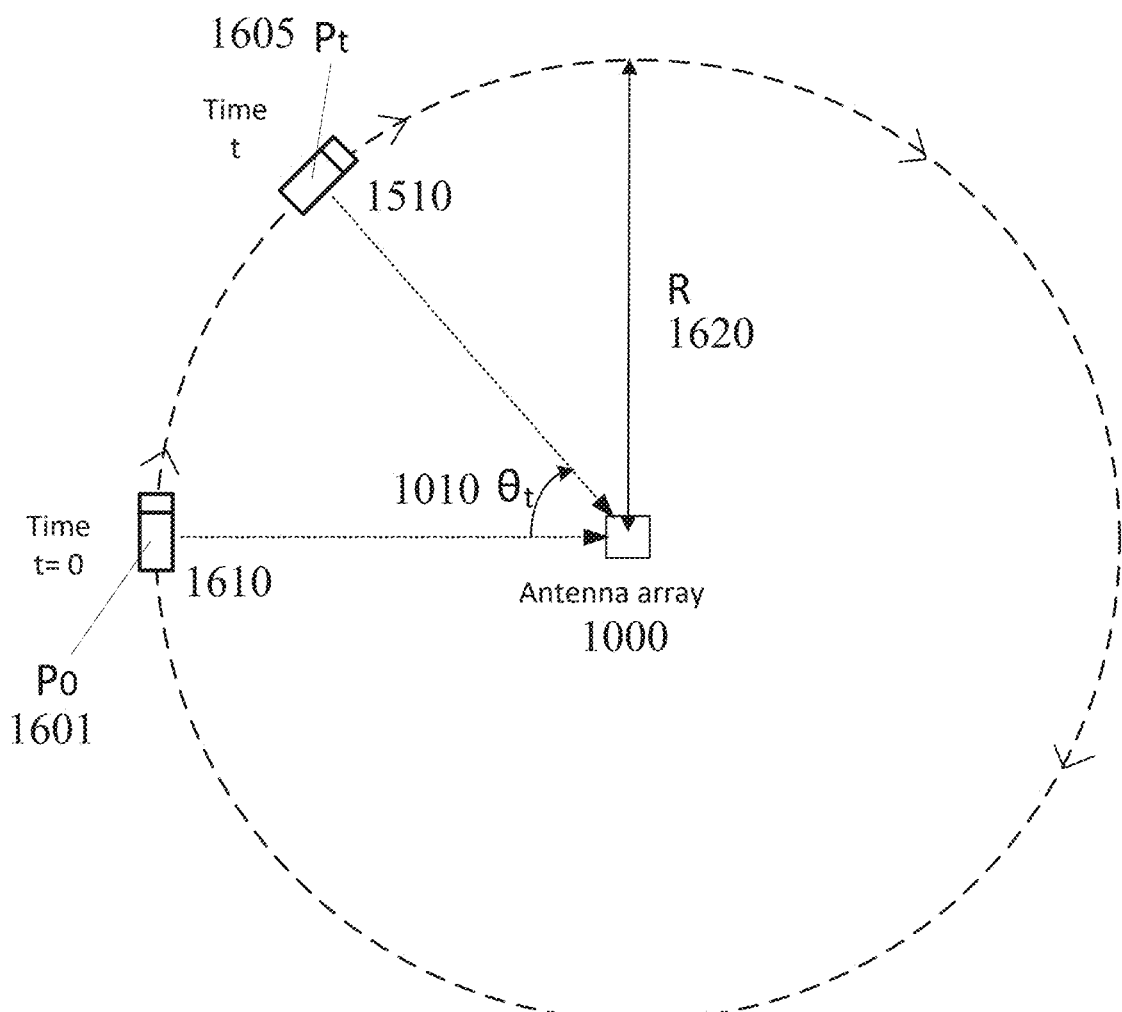
FIG. 16 illustrates a transmitter moving around an antenna array, in accordance with some embodiments.

FIG. 16 depicts a transmitter 1610 moving at a constant velocity v in a circular orbit, having a radius R 1620, clockwise around an antenna array 1000. At time t=0, the transmitter 1610 is at position $P_0$ 1601 and the AoA, $\theta$ 14, at antenna array 1000, is 0 degrees. At time t, transmitter 1610 is at position Pt 1605 and the AoA, $\theta$ 14, at antenna array 1000 is $\theta$t degrees. Assuming a velocity v of 35 mph and a radius of 1200 feet, an AoA may be calculated for every 2 second period. In 142 seconds, transmitter 1610 will cause the true AoAs at the antenna array 1000 to vary from 0 to 348 degrees.

Figure 17:
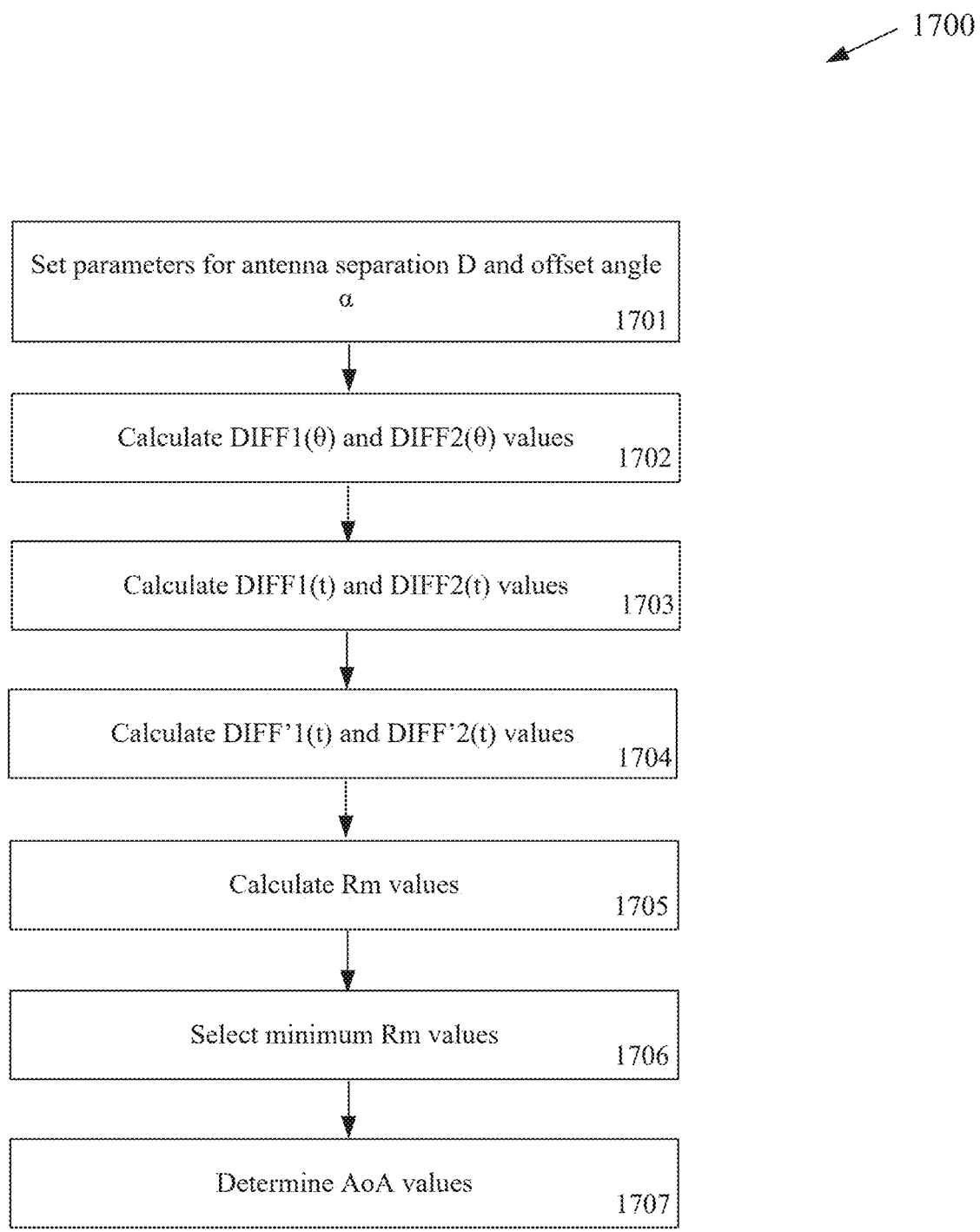
FIG. 17 a flowchart illustrating a process for using a set of AoAs to simulate the accuracy of an antenna array, in accordance with some embodiments.

FIG. 17 is a flowchart of a process 1700 for using the set of true AoAs as depicted in FIG. 16, to simulate the accuracy of the antenna array 1000.

At step 1701, parameters antenna separation D and offset angle $\alpha$ for antenna array 1000 are set.

At step 1702, values of DIFF1($\theta$) and DIFF2($\theta$) for AoAs are calculated (e.g., using the process 1200 of FIG. 12). In some examples, the DIFF1($\theta$) and DIFF2($\theta$) values are calculated for a $\theta$ range spanning from 0 to 360 degrees, in m steps of n degrees (e.g., n=1, 2, 3, 4, 5 degrees). In some examples, the calculated values are used to create a look-up table of $\theta$n,m, DIFF1($\theta$n,m), DIFF2 ($\theta$n,m) values.

At step 1703, values of DIFF1(t) and DIFF2(t) are calculated for the AoAs of the signal from transmitter 1610, $\theta$t 1010, at 2 second intervals (e.g., using the process 1200 of FIG. 12).

At step 1704, values of DIFF'1(t) and DIFF'2(t) are calculated. In some examples, the DIFF'1(t) and DIFF'2(t) values are calculated by selecting a random DIFFS error, E. For each t, 0 to 142 seconds in 2 second intervals, the DIFF'1(t) and DIFF'2(t) values are calculated by adding the random errors E to the corresponding DIFF1(t) and DIFF2(t) values, as shown below:

DIFF'1(*t*)=DIFF1(*t*)+RANDBETWEEN (−€,€)

DIFF'2(*t*)=DIFF2(*t*)+RANDBETWEEN (−€, €)

At step 1705, an Rm value is calculated for each value of t, for $\theta$n,m=0 to 360 degrees in m steps of n degrees, as shown below in equation (17):

$$R_m=|DIFF1(\theta)-DIFF'1(t)|+DIFF2(\theta)-DIFF'2(t)| \quad (17)$$

Rm is a value representative of the match of DIFF'1(t) and DIFF'2(t) to DIFF1($\theta$) and DIFF2($\theta$), respectively.

At step 1706, a minimum Rm value, Rmin, is selected for each value of t. The minimum value of Rm represents the best match, and the value of $\theta$n,m corresponding to the minimum value of Rm may then be selected once the minimum Rm is identified and selected. In some examples, Rmin is calculated for each value of t as shown by equation (18):

$$R\text{min}=\text{MINIMUM } (R_m) \quad (18)$$

At step 1707, an AoA value is determined for each value of t. For $\theta$=0 to 360 degrees, in m steps of n degrees, a of list $\theta$n,m values (i.e., lookup table) that correspond to Rmin is used. If only a single $\theta$n,m value corresponds to the Rmin value, then the $\theta$n,m value is selected as the "measured" AoA. If more than one $\theta$n,m value corresponds to the Rmin value, the "measured" AoA is the average of the $\theta$n,m values, as shown in equation (19):

$$\text{AoA=Average } (\theta) \quad (19)$$

Figure 18:
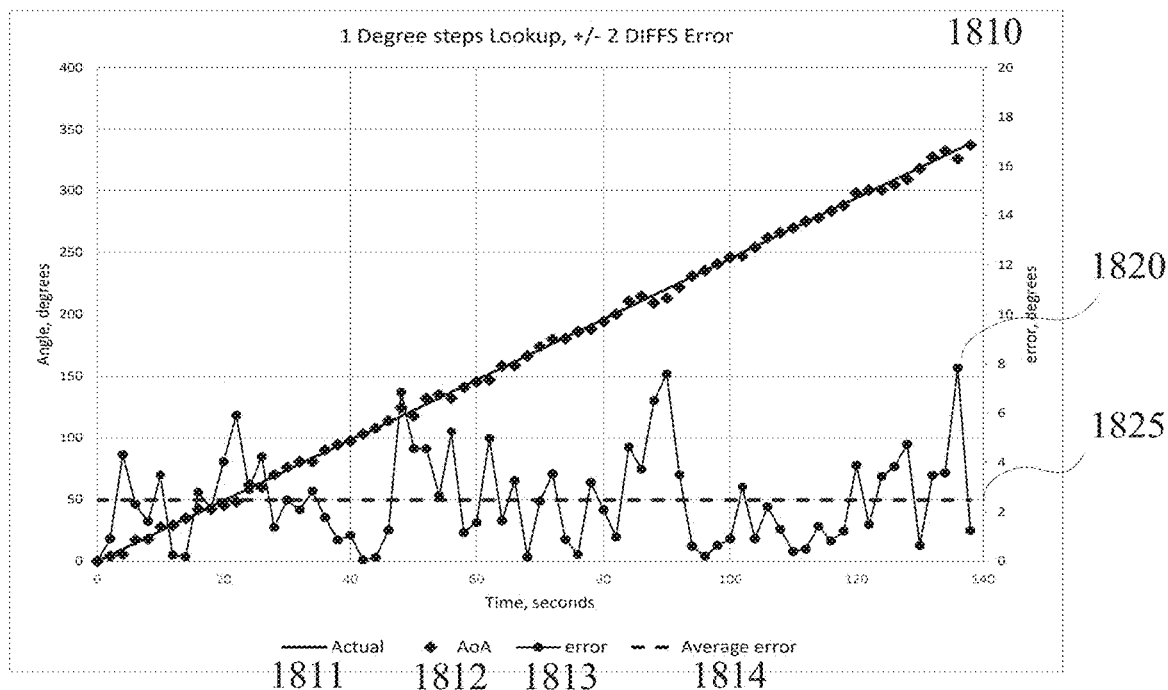
FIG. 18 illustrates a graphical representation of example simulated measurements of AOAs for a transmitter moving around an antenna array, in accordance with some embodiments.

FIG. 18 is a graphical representation 1810 of example simulated measurements of AoAs for the transmitter 1610 when moving around the orbit as discussed above with reference to FIG. 16. The simulated measurements of FIG. 18 correspond to an antenna separation of D=$\lambda$/3 and an offset angle of $\alpha$=45 degrees. To simulate practical received signal strength indicator (RSSI) measurements, a random error €=2 has been used. Graph 1810 is for n=1, i.e., the lookup table is in 1 degree steps. Graph 1810 shows the simulated AoA 1811 and the "measured" AoA 1812. The AoA error 1813 is also shown and the maximum error, for the example run, is approximately 8 degrees (as indicated at 1820). The AoA error 1813 may be calculated as the difference between the simulated AoA 1811 and the "measured" AoA 1812. The average error 1814 for the example run is approximately 2.5 degrees (as indicated at 1825).

Figure 19:
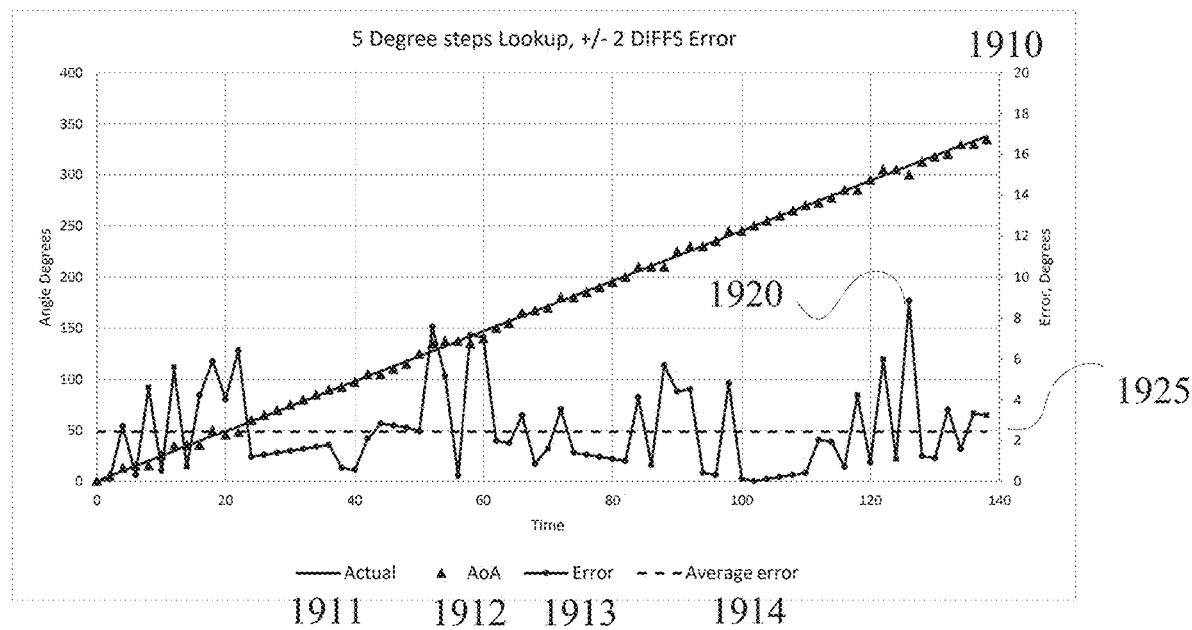
FIG. 19 illustrates a graphical representation of simulated measurements of AOAs for a transmitter moving around an antenna array, in accordance with some embodiments.

FIG. 19 is a graphical representation 1910 of an example simulated measurements of AOAs with the same conditions as in FIG. 18, except n=5, i.e., the lookup table is in 5 degrees steps. Graph 1910 shows the simulated AoA 1911 and the "measured" AoA 1912. The AoA error 1913 is also shown and the maximum error, for the example run, is approximately 9 degrees (as indicated at 1920). The average error 1914 for the example run is again approximately 2.5 degrees (as indicated at 1925).

Figure 20:
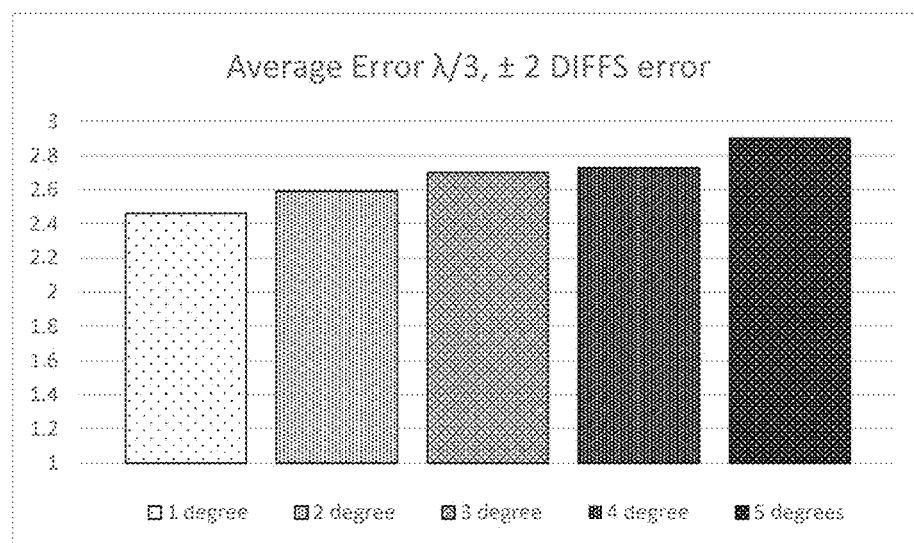
FIG. 20 illustrates a bar plot of an average error of simulated measurements of AoAs, in accordance with some embodiments.

FIG. 20 is a graphical representation of the average error over 10 runs of simulated measurements, as described above, for lookup table step values of n=1, 2, 3, 4 and 5 degrees. The results indicate that the average error is in the order of 2.5 degrees, and the increase in average error as n varies from 1 to 5 degrees, is less than approximately 0.5 degrees.

Figure 21:
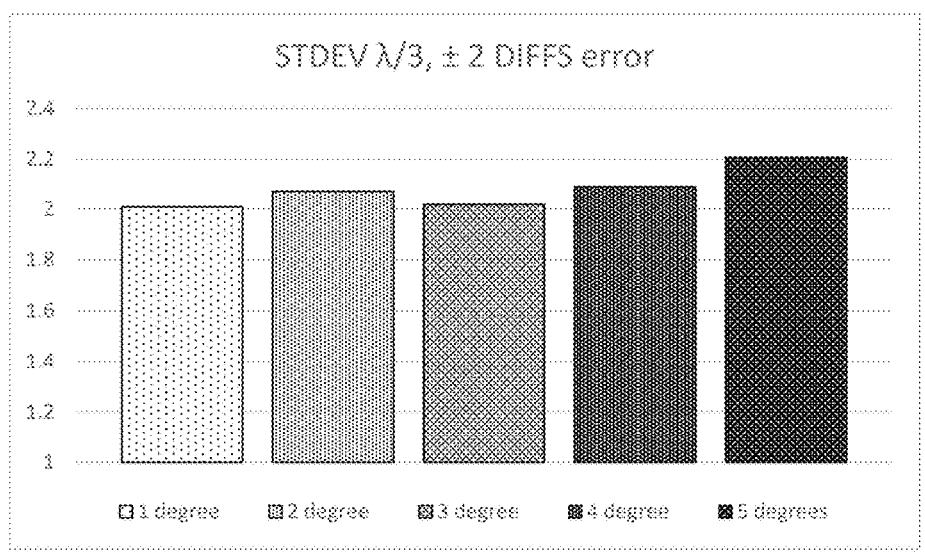
FIG. 21 illustrates a bar plot of a standard deviation of an AoA error of AoA simulated measurements, in accordance with some embodiments.

FIG. 21 is a graphical representation of the standard deviation of the AoA error averaged over 10 runs of simulated measurements, as described above, for lookup table step values of n=1, 2, 3, 4 and 5 degrees. The results indicate that the standard deviation is in the order of 2 degrees, and the increase in standard deviation, as n varies from 1 to 5 degrees, is less than approximately 0.2 degrees.

Figure 22:
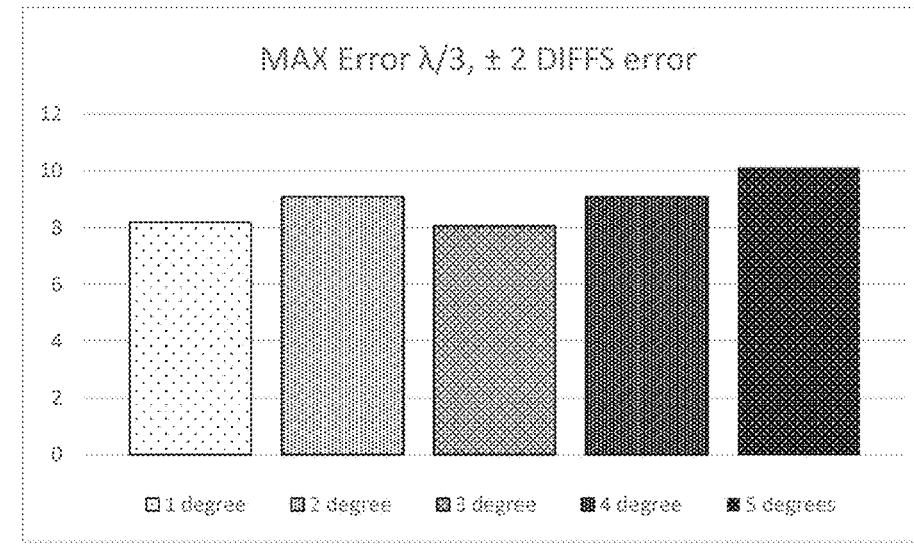
FIG. 22 illustrates a bar plot of a maximum AoA error of AoA simulated measurements, in accordance with some embodiments.

FIG. 22 is a graphical representation of the maximum AoA error averaged over 10 runs of simulated measurements, as described above, for lookup table step values of n=1, 2, 3, 4, and 5 degrees. The results indicate that the maximum error is in the order of 9 degrees, and the increase in maximum error, as n varies from 1 to 5 degrees, is approximately 2 degrees.

The results shown in FIGS. 18, 19, 20, 21, and 22 indicate that different step sizes, i.e., 1, 2, 3, 4, or 5 degrees, used for the lookup table of θn,m, DIFF1, and DIFF2 values do not unduly impact the accuracy of the method. A lookup table using n=5 degrees has 72 entries, whereas with n=1 degree, the table has 360 entries. As discussed above with reference to FIG. 7, the RSSI of the sum and diff signal levels may be measured by an RF receiver in 1 dB increments. Hence, even if the RF receivers were perfectly matched, there might be a 1 dB error.

Figure 23:
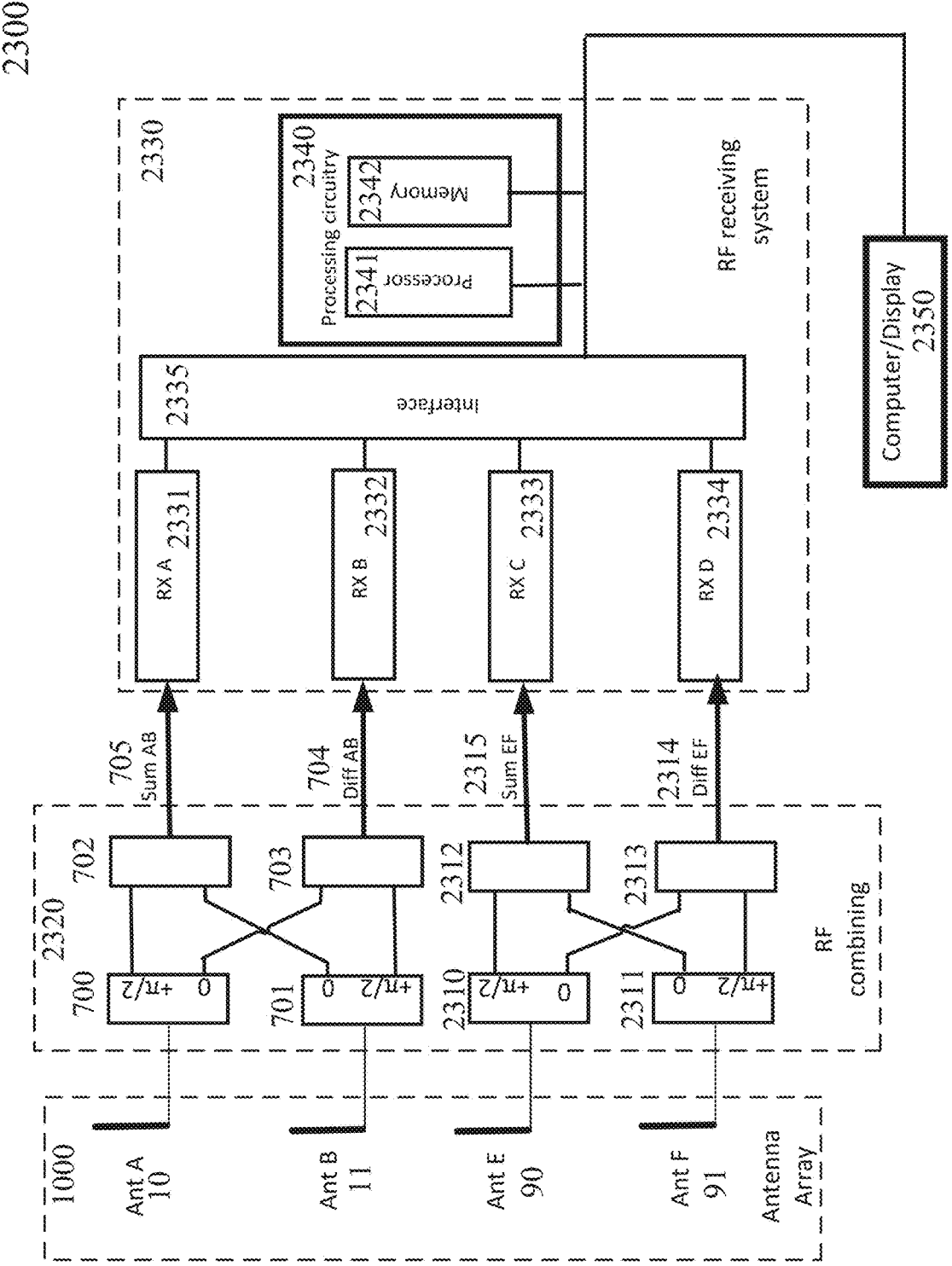
FIG. 23 illustrates a schematic block diagram of an example system for measuring AoA, in accordance with some embodiments.

FIG. 23 is a schematic block diagram representation of an embodiment of an example system 2300, for measuring AoA. System 2300 includes the antenna array 1000, an RF combining block 2320, an RF receiving system 2330 and a computer/display 2350. As described above, the antenna array 1000 has four antennas, antenna A 10, antenna B 11, antenna E 90, and antenna F 91. The signals from the four antennas in the antenna array 1000 are applied to the inputs of 2-way 90 degree splitters in the RF combining block 2320. In some examples, the signals from antenna A 10 and antenna B 11 are applied to inputs of 2-way 90 degree splitters 700 and 701, respectively. The +90 degree output from splitter 700 is connected to one input of a 2-way 0 degree combiner 702. Similarly, the +90 degree output from splitter 701 is connected to one input of a 2-way 0 degree combiner 703. The 0 degree output from splitter 700 is connected to the other input of combiner 703, whereas the 0 degree output from splitter 701 is connected to the other input of combiner 702. Hence, the signal sum AB 705 at the output of splitter 702 is the sum of the signal from antenna A 10 shifted by +90 degrees and the signal from antenna B 11 shifted by 0 degrees. Similarly, the signal diff AB 704 at the output of splitter 703 is the sum of the signal from antenna A 10 shifted by 0 degrees and the signal from antenna B 11 shifted by +90 degrees.

In some examples, the signals from antenna E 90 and antenna F 91 are applied to the inputs of 2-way 90 degree splitters 2310 and 2311, respectively. The +90 degree output from splitter 2310 is connected to one input of a 2-way 0 degree combiner 2312. Similarly, the +90 degree output from splitter 2311 is connected to one input of a 2-way 0 degree combiner 2313. The 0 degree output from splitter 2310 is connected to the other input of combiner 2313, whereas the 0 degree output from splitter 2311 is connected to the other input of combiner 2312. Hence, the signal sum EF 2315 at the output of combiner 2312 is the sum of the signal from antenna E 90 shifted by +90 degrees and the signal from antenna F 91 shifted by 0 degrees. Similarly, the signal diff EF 2314 at the output of combiner 2313 is the sum of the signal from antenna E 90 shifted by 0 degrees and the signal from antenna F 91 shifted by +90 degrees.

The signals sum AB 705, diff AB 704, sum EF 2315, and diff EF 2314 are inputted to RX A 2331, RX B 2332, RX C 2333, and RX D 2334 of RF receiving system 2330, respectively. In some examples, the RSSI for each of these signals is measured, in dBm, by RX A 2331, RX B 2332, RX C 2333, and RX D 2334, respectively, and outputted, via interface 2335 to processor 2341 in processing circuitry 2340. RX A 2331, RX B 2332, RX C 2333, and RX D 2334 of RF receiving system 2330 are RF receivers capable of demodulating and measuring the RSSI of RF packets from RF transmitters of the signal(s) of interest.

Interface 2335 and processing circuitry 2340 may be used to subtract the RSSI values, in dBm, of the signals sum AB 705, diff AB 704, and also to subtract the RSSI values of the signals sum EF 2315, diff EF 2314, so as to produce the respective values for DIFF1 and DIFF2.

Figure 6:
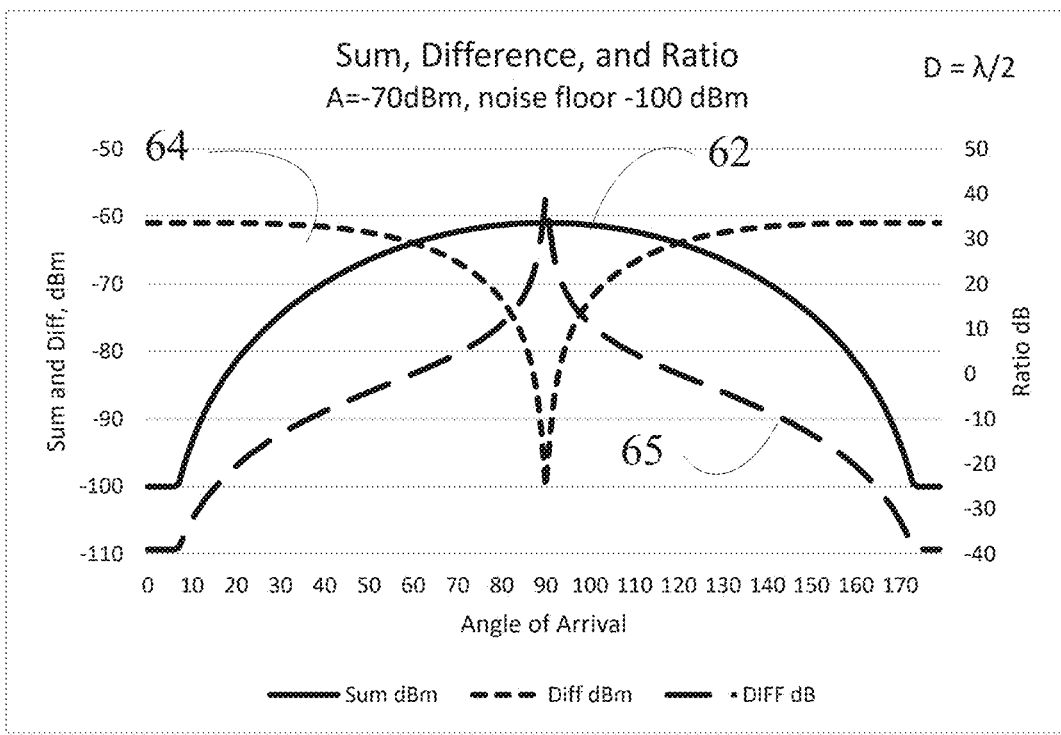
FIG. 6 illustrates a graphical representation of the sum amplitude, the difference amplitude, and the ratio produced by the system of FIG. 5, in accordance with some embodiments.

The processing circuitry 2340 (i.e., processor 2341 and memory 2342) may also be used to calculate the effective input signal strength at the antenna pairs. This calculation may be accomplished, for example, by converting the two RSSI values (i.e., of sum AB 705 and diff AB 704 or sum EF 2315 and diff EF 2314) to milliwatts, adding them and then converting the value back to dBm. As discussed above with respect to FIGS. 6, 13, and 14, the peak values of DIFF1 and DIFF2 may be affected by the antenna input signal level. Hence, in some examples, a knowledge of the signal level may be used to estimate the peak values and the effective flattening. In some examples, a separate receiver/antenna pair may be provided to measure the received signal strength, or, in some examples, the receiver system 2330 includes a fifth receiver, and the output signal from any of the antennas A, B, E or F is inputted to this receiver to measure the received signal strength.

The conversion of the DIFF1 and DIFF2 values to AoAs may be carried out in the processing circuitry 2340, or in a computer/display 2350, using a lookup table of θ, DIFF1, DIFF2 that may be stored in memory 2342. Similarly, the computer/display 2350 may include processing circuitry, such as a processor and a memory, in which the memory stores instructions that, when executed by the processor, cause the processor to perform functions described herein to determine the AoAs. The display 2350 may be any display device suitable for presenting a user with the AoA and other information.

As described above, the signals sum AB 705, diff AB 704, sum EF 2315, and diff EF 2314 are used to determine the AoA. The AoA determination may be accomplished by direct application of the equations (8) to (14) and/or via lookup table(s) based upon these same equations. In some examples, the look-up tables may be constructed or amended by calibration.

In some embodiments, the receiving system 2330 includes processing circuitry 2340, including processor 2341 and memory 2342, in which memory 2342 stores instructions that, when executed by the processor 2341, cause the processor 2341 to perform functions described herein to determine the AoAs.

In addition to a traditional processor(s) and memory, the processing circuitry of receiving system 2330 and computer/display 2350 may include integrated circuitry for processing and/or control (e.g., one or more processors, processor cores, Field Programmable Gate Arrays (FPGAs), and/or Application Specific Integrated Circuitry (ASICs)). The processor(s) may be configured to access (e.g., write to and/or read from) memory, which may comprise any kind of volatile and/or nonvolatile memory (e.g., cache memory, buffer memory, Random Access Memory (RAM), Read-Only Memory (ROM), optical memory, and/or Erasable Programmable Read-Only Memory (EPROM)). Such memory may be configured to store code executable by processors and/or other data (e.g., data pertaining to communication, such as the configuration and/or address data of nodes, etc.).

The processing circuitry of the receiving system 2330 and computer/display 2350 may be configured to control any of the methods and processes described herein, or to cause such methods and processes to be performed. Corresponding instructions may be stored in memory 2342, which may be readable and/or readably connected to processor 2341.

Figure 24:
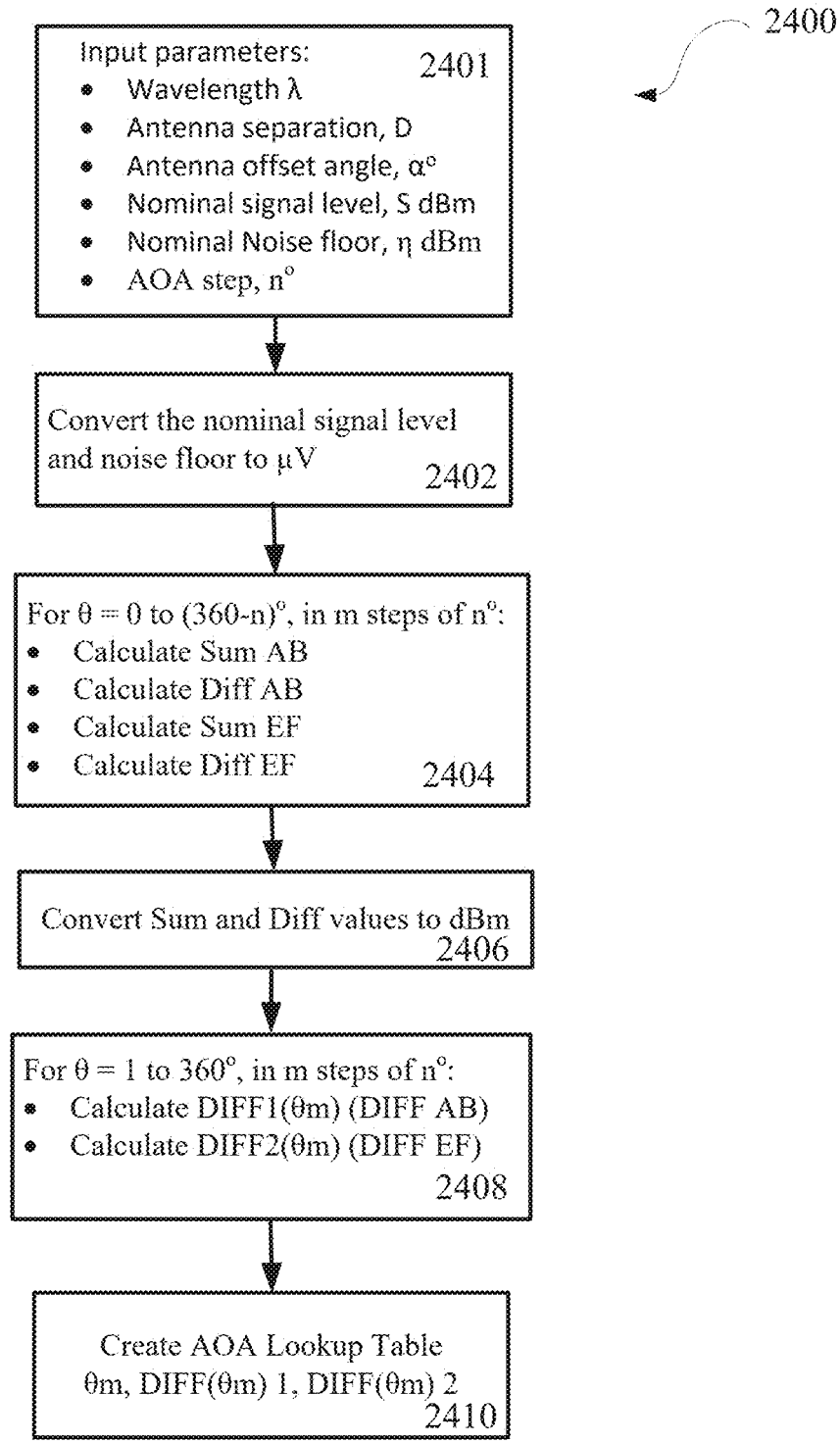
FIG. 24 is a flowchart illustrating a process for creating an AoA lookup table, in accordance with some embodiments.

FIG. 24 is a flowchart of a process 2400 for creating an AoA lookup table in accordance with aspects described herein. Process 2400 starts at step 2401, where a number of parameters may be inputted. The input parameters may include an expected RF input signal wavelength A. In some examples, the frequency of the expected RF input signal may be inputted and the wavelength is calculated from the frequency. The input parameters may include antenna separation, D. In some examples, D is input in terms of wavelength λ. The input parameters may also include antenna offset angle, α, nominal signal level, S dBm, nominal noise floor, n dBm, and AoA step, n degrees. It should be appreciated that other input parameters may be contemplated.

The input parameters may be entered manually via the computer/display 2350, or may be preset and stored in memory 2342 of processing circuitry 2340. As discussed above with reference to FIGS. 13, 14, and 15, the antenna separation D and the offset angle α are chosen such that the DIFF1 and DIFF2 values are unique over 360 degrees. In some examples, values of D=λ/3 and α=45 degrees are preferred values. The choice of values for the nominal signal level and noise floor may be governed by various factors including the bandwidth of the incident RF signal and the desired propagation range of the AoA measurement. For example, the noise floor for a 20 MHz bandwidth signal might be taken as −100 dBm, whereas for a 1 MHz bandwidth signal, a noise floor of −114 dBm may be used. The value for the nominal signal level may be based upon the expected signal to noise ratio (SNR). For example, for an SNR of 20 dB, the nominal signal level might be set to be 20 dB greater than the noise floor setting.

In step 2402, the nominal signal level S and noise floor n are converted from dBm to μV, as shown in equation (20):

$$S_{\mu V} = \sqrt{10^{\left(\frac{S_{dBm}}{10}\right)} \cdot 10^9 \cdot 50} \quad \eta_{\mu V} = \sqrt{10^{\left(\frac{\eta_{dBm}}{10}\right)} \cdot 10^9 \cdot 50} \quad (20)$$

In step 2404, the sum and diff values, in μV, for antenna pairs AB and EF are calculated as follows:

$$\text{Let } m \in \left\{0, 1, 2, \ldots, \frac{360}{n} - 2, \frac{360}{n} - 1\right\} \quad (21)$$

Then, the angle $\theta_{n,m}$ of the incident signal is $\theta_{n,m} = n \cdot m$ degrees
(22)
For example, if n=5°, then m∈{0, 1, 2, . . . , 70, 71}, therefore $\theta_{5,12}=60°$ and $\theta_{5,71}=355°$
From equation (8), $$\text{Sum } AB_{n,m}(\mu V) = S_{\mu V} \sqrt{2 + 2\sin\Phi_{1,n,m}}$$

where, from equation (12), $\phi_{1,n,m} = 2 \pi D \cos(\theta_{n,m} - \alpha)/\lambda$
Taking in account the noise floor:

$$\text{Sum } AB_{n,m}(\mu V) < \eta_{\mu V} \Rightarrow \text{Sum } AB_{n,m}(\mu V) = \eta_{\mu V} \quad (23)$$

Similarly,
From equation (9), $$\text{Diff } AB_{n,m}(\mu V) = S_{\mu V} \sqrt{2 - 2\sin\Phi_{1,n,m}}$$

$$\text{Diff } AB_{n,m}(\mu V) < \eta_{\mu V} \Rightarrow \text{Diff } AB_{n,m}(\mu V) = \eta_{\mu V} \quad (24)$$

Similarly, Sum $EF_{n,m}$ (μV) and Diff $EF_{n,m}$ (μV) may be calculated for each $\theta_{n,m}$.

In step 2406, the various Sum and Diff values are converted to dBm, as follows:

$$\text{Sum } AB_{n,m}(dBm) = \text{floor}\left(10\log\left(\frac{\text{Sum } AB_{n,m}^2(\mu V) \cdot 10^{-9}}{50}\right)\right)$$

$$\text{Diff } AB_{n,m}(dBm) = \text{floor}\left(10\log\left(\frac{\text{Diff } AB_{n,m}^2(\mu V) \cdot 10^{-9}}{50}\right)\right)$$

$$\text{Sum } EF_{n,m}(dBm) = \text{floor}\left(10\log\left(\frac{\text{Sum } AB_{n,m}^2(\mu V) \cdot 10^{-9}}{50}\right)\right) \quad (25)$$

$$\text{Diff } EF_{n,m}(dBm) = \text{floor}\left(10\log\left(\frac{\text{Diff } AB_{n,m}^2(\mu V) \cdot 10^{-9}}{50}\right)\right)$$

In step 2408, the DIFF1 and DIFF2 values are calculated, as follows:

$$\text{DIFF1}_{n,m} = \text{Sum } AB_{n,m} \text{ (dBm)} - \text{Diff } AB_{n,m} \text{ (dBm)}$$

$$\text{DIFF2}_{n,m} = \text{Sum } EF_{n,m} \text{ (dBm)} - \text{Diff } EF_{n,m} \text{ (dBm)} \quad (26)$$

In step 2410, the AoA lookup table comprising $\theta_{n,m}$, $\text{DIFF1}_{n,m}$, and $\text{DIFF2}_{n,m}$ is created. The calculations as described above in process 2400 may be performed for various values of n, for example, n=1, 2, 3, 4, or 5 degrees, and the resulting lookup table(s) stored on memory 2342. As discussed above with reference to FIGS. 18, 19, 20, 21, and 22, the accuracy of the measured AoA is not significantly changed by using a lookup table of n=1 degree compared to n=5 degrees, hence, in some examples, only a single lookup table may be stored.

Figure 25:
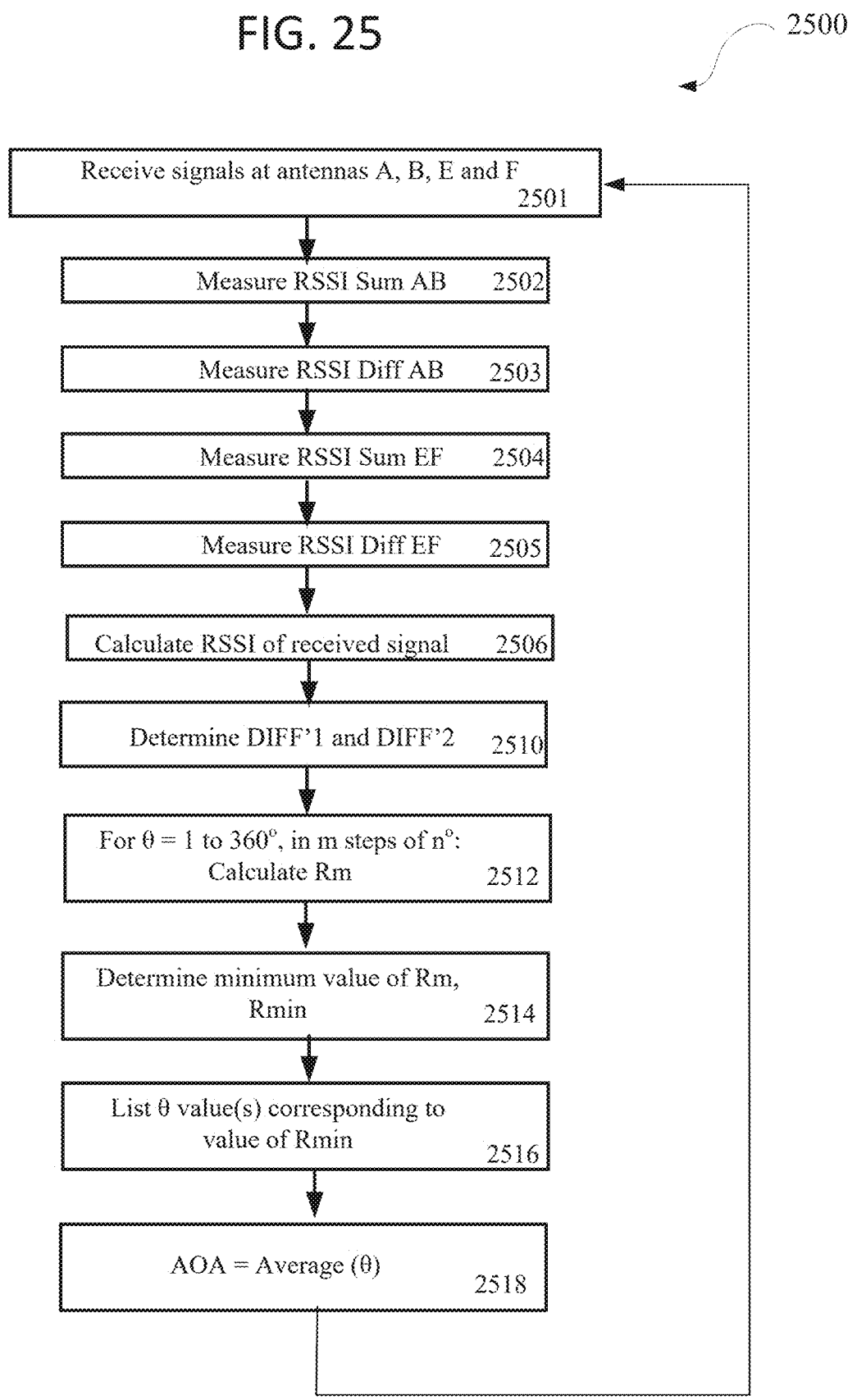
FIG. 25 is a flowchart illustrating a process for determining the AoA of an incident RF signal, in accordance with some embodiments.

FIG. 25 is a flowchart of a process 2500 for determining the AoA of an incident RF signal in accordance with aspects described herein. In some examples, the process 2500 uses the antenna array 1000 and the system 2300, as discussed above with reference to FIGS. 11 and 23. Process 2500 starts at step 2501, where a signal is received at the antennas, A 10, B 11, E 90, and F 91. At step 2502, the magnitude of the signal sum AB (dBm) 705, received at the input of RX A 2331, is reported by RX A 2331 to processor 2341, via interface 2335. At step 2503, the magnitude of the signal diff AB (dBm) 704, received at the input of RX B 2332, is reported by RX B 2332 to processor 2341 via interface 2335. At step 2504, the magnitude of the signal sum EF (dBm) 2315, received at the input of RX C 2333, is reported by RX C 2333 to processor 2341 via interface 2335. At step 2505, the magnitude of the signal diff EF (dBm) 2314, received at the input of RX D 2334, is reported by RX D 2334 to processor 2341 via interface 2335.

At step 2506, the magnitude, S dBm, of the received RF signal is calculated as:

$$S\ dBm = 10\text{LOG}\left(10\frac{sumAB\ dBm}{10} + 10\frac{diffAB\ dBm}{10}\right)$$

At step 2510, the values for DIFF'1 and DIFF'2 are derived as follows:

DIFF'1=sum AB (dBm)−diff AB (dBm)

DIFF'2=sum EF (dBm)−diff EF (dBm)

In some examples, the calculation(s) of step 2510 are performed by processor 2341 in processing circuitry 2340.

In step 2512, to find the best match, the values DIFF'1 and DIFF'2 are compared to a lookup table (e.g., derived in process 2400). In some examples, the comparison includes calculating a value Rm, as shown in equation (27):

$$\text{For } m = 0 \text{ to } \left(\frac{360}{n} - 1\right) R_m = |DIFF1_{n,m} - DIFF'1| + |DIFF2_{n,m} - DIFF'2| \quad (27)$$

At step 2514, the minimum value of Rm is determined, as shown below:

Rmin=minimum ($R_m$)

In step 2516, all angles $\theta_m$ that correspond to Rmin are selected from the lookup table.

In step 2518, the average of the selected angles is outputted as the measured AoA. In some examples, the process then returns to step 2501.

In some examples, if more than one Om value corresponds to Rmin, then the angles are consecutive and the average is straightforward. However, for AoAs near 0 degrees (or 360 degrees), simple averaging may result in errors. For example, for an incident signal at 0 degrees, if the angles $\theta_m$ that correspond to Rmin are 2, 0, and 358 (assuming n=2), then a simple average would be 87 degrees (i.e., a large error). In this case however, the angles are not numerically consecutive. Hence, the average should be taken for the negative angles, in this example 2, 0, −2, which results in an average of 0 degrees. A simple test for this condition can be made to check that the values for the angles $\theta_m$ that correspond to Rmin are, in fact, consecutive and to use the corresponding negative values if not. Another approach to avoid large errors caused by near 0 degree values is to take the arctangent of the sum of sines $\theta_m$ divided by the sum of the cosines $\theta_m$.

In some examples, the calculations in steps 2510, 2512, 2514, 2516, and 2518 are performed by processor 2341 in processing circuitry 2340.

Described above is an embodiment using four antennas arranged with a common, but opposite, offset angles, that allows for full 360 degree unique resolution off the DIFF values. It should be appreciated that different combinations of antenna spacing, offset angles, and antenna combining may be used. Thus, the disclosure and implementations are not intended to be limited to four antennas arranged as described in some embodiments herein.

While the above description contains many specifics, these should not be construed as limitations on the scope, but rather as an exemplification of several embodiments thereof. Many other variants are possible including, for example: various phasing and combining schemes, the use of different antennas, the use of three four or more antennas per array, the use of a variety of antenna directivity, the use of different measuring RF receiver schemes, the number of receive chains, integral or separate processor(s), integral or separate computer and display(s), the use of various separations of the antennas, and the use of various offset angles.

Some Embodiments

Some embodiments may include any of the following:

A1. A method for determining an angle of arrival (AoA) of a radio frequency (RF) signal received at an antenna array including determining a plurality of theoretical signals to be received at an antenna array having at least a first antenna pair and a second antenna pair, wherein antennas of the first antenna pair are offset from each other by a first offset angle and antennas of the second antenna pair are offset from each other by a second offset angle; generating an AoA look-up table for the antenna array based on a plurality of theoretical signals; receiving an RF signal at each pair of antennas of the antenna array; combining outputs of the antennas in each antenna pair to produce first sum and difference signals for the first antenna pair and second sum and difference signals for the second antenna pair; calculating a first difference value corresponding to a signal level difference between the first sum signal and the first difference signal; calculating a second difference value corresponding to a signal level difference between the second sum signal and the second difference signal; comparing the first and second difference values to theoretical difference values in the AoA look-up table, wherein the theoretical difference values correspond to different AoAs; and determining a measured AoA of the RF signal based on the comparison of the first and second difference values to the theoretical difference values.

A2. The method of clause A1 can include any of the following components or features, in any combination. The first offset angle has a value of +α and the second offset angle has a value of −α. Generating the AoA look-up table for the antenna array based on the plurality of theoretical signals includes determining a plurality of AoAs for the plurality of theoretical signals; calculating, for each antenna pair, theoretical sum and difference signals for the plurality of theoretical signals; calculating, for each antenna pair, the theoretical difference values based on a signal level difference between the theoretical sum signals and the theoretical difference signals; and recording, in the AoA look-up table, a first theoretical difference value for the first antenna pair and a second theoretical difference value for the second antenna pair for each AoA of the plurality of AoAs. The theoretical sum and difference values vary based on a spacing D between the antennas in each antenna pair, the first offset angle, and the second offset angle. The values of the spacing D, the first offset angle, and the second offset angle are selected such that each AoA of the plurality of AoAs has a unique pair of first and second theoretical difference values in the AoA lookup table. The plurality of AoAs for the plurality of theoretical signals are in steps of n degrees from 0 to 360-n degrees. Determining the measured AoA of the RF signal based on the comparison of the first and second difference values to the theoretical difference values comprises selecting first and second theoretical difference values in the lookup table that are closest to the first and second difference values. Identifying first and second theoretical difference values in the lookup table that are closest to the first and second difference values comprises: calculating a plurality of Rm values:

$$\text{for } m = 0 \text{ to } \left(\frac{360}{n} - 1\right), R_m = |DIFF1_{n,m} DIFF'1| + |DIFF2_{n,m} DIFF'2|,$$

wherein $DIFF1_{n,m}$ corresponds to the first theoretical difference values in the lookup table, $DIFF2_{n,m}$ corresponds to the second theoretical difference values in the lookup table, DIFF'1 corresponds to the first difference value, and DIFF'2 corresponds to the second difference value; determining a minimum value for $R_m$ from the plurality of $R_m$ values; and selecting the first and second theoretical difference values corresponding to the minimum value for $R_m$ as the closest to the first and second difference values. The AoA associated with the selected first and second theoretical difference values from the lookup table is used as the measured AoA for the RF signal. A plurality of AoAs associated with the selected first and second theoretical difference values from the lookup table are averaged, and the average AoA value is used as the measured AoA for the RF signal.

A3. A system for determining an angle of arrival (AoA) of a radio frequency (RF) signal received at an antenna array, the system including an antenna array having at least a first antenna pair and a second antenna pair, the antenna array being configured to receive an RF signal at each pair of antennas of the antenna array, wherein antennas of the first antenna pair are offset from each other by a first offset angle and antennas of the second antenna pair are offset from each other by a second offset angle; a combining block configured to combine outputs of the antennas in each antenna pair to produce first sum and difference signals for the first antenna pair and second sum and difference signals for the second antenna pair; at least one memory device with computer-executable instructions stored thereon; and at least one processor for executing the computer-executable instructions stored on the at least one memory device, wherein execution of the computer-executable instructions by the at least one processor causes the at least one processor to perform operations comprising: determining a plurality of theoretical signals to be received at an antenna array having at least a first antenna pair and a second antenna pair; generating an AoA look-up table for the antenna array based on a plurality of theoretical signals; calculating a first difference value corresponding to a signal level difference between the first sum signal and the first difference signal; calculating a second difference value corresponding to a signal level difference between the second sum signal and the second difference signal; comparing the first and second difference values to theoretical difference values in the AoA look-up table, wherein the theoretical difference values correspond to different AoAs; and determining a measured AoA of the RF signal based on the comparison of the first and second difference values to the theoretical difference values.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method for determining an angle of arrival (AoA) of a radio frequency (RF) signal received at an antenna array, the method comprising:

determining a plurality of theoretical signals to be received at an antenna array having at least a first antenna pair and a second antenna pair, wherein antennas of the first antenna pair are offset from each other by a first offset angle and antennas of the second antenna pair are offset from each other by a second offset angle;

generating an AoA look-up table for the antenna array based on a plurality of theoretical signals;

receiving an RF signal at each pair of antennas of the antenna array;

combining outputs of the antennas in each antenna pair to produce first sum and difference signals for the first antenna pair and second sum and difference signals for the second antenna pair;

calculating a first difference value corresponding to a signal level difference between the first sum signal and the first difference signal;

calculating a second difference value corresponding to a signal level difference between the second sum signal and the second difference signal;

comparing the first and second difference values to theoretical difference values in the AoA look-up table, wherein the theoretical difference values correspond to different AoAs; and determining a measured AoA of the RF signal based on the comparison of the first and second difference values to the theoretical difference values.

2. The method of claim 1, wherein the first offset angle has a value of $+\alpha$ and the second offset angle has a value of $-\alpha$.

3. The method of claim 1, wherein generating the AoA look-up table for the antenna array based on the plurality of theoretical signals comprises:

determining a plurality of AoAs for the plurality of theoretical signals;

calculating, for each antenna pair, theoretical sum and difference signals for the plurality of theoretical signals;

calculating, for each antenna pair, the theoretical difference values based on a signal level difference between the theoretical sum signals and the theoretical difference signals; and recording, in the AoA look-up table, a first theoretical difference value for the first antenna pair and a second theoretical difference value for the second antenna pair for each AoA of the plurality of AoAs.

4. The method of claim 3, wherein the theoretical sum and difference values vary based on a spacing D between the antennas in each antenna pair, the first offset angle, and the second offset angle.

5. The method of claim 4, wherein the values of the spacing D, the first offset angle, and the second offset angle are selected such that each AoA of the plurality of AoAs has a unique pair of first and second theoretical difference values in the AoA lookup table.

6. The method of claim 3, wherein the plurality of AoAs for the plurality of theoretical signals are in steps of n degrees from 0 to 360-n degrees.

7. The method of claim 6, wherein determining the measured AoA of the RF signal based on the comparison of the first and second difference values to the theoretical difference values comprises selecting first and second theoretical difference values in the lookup table that are closest to the first and second difference values.

8. The method of claim 7, wherein identifying first and second theoretical difference values in the lookup table that are closest to the first and second difference values comprises:
calculating a plurality of $R_m$ values:

$$\text{for } m = 0 \text{ to } \left(\frac{360}{n} - 1\right),$$

$$R_m = |DIFF1_{n,m} - DIFF'1| + |DIFF2_{n,m} - DIFF'2|,$$

wherein $DIFF1_{n,m}$ corresponds to the first theoretical difference values in the lookup table, $DIFF2_{n,m}$ corresponds to the second theoretical difference values in the lookup table, DIFF'1 corresponds to the first difference value, and DIFF'2 corresponds to the second difference value;
determining a minimum value for $R_m$ from the plurality of $R_m$ values; and
selecting the first and second theoretical difference values corresponding to the minimum value for $R_m$ as the closest to the first and second difference values.

9. The method of claim 7, wherein the AoA associated with the selected first and second theoretical difference values from the lookup table is used as the measured AoA for the RF signal.

10. The method of claim 7, wherein a plurality of AoAs associated with the selected first and second theoretical difference values from the lookup table are averaged, and the average AoA value is used as the measured AoA for the RF signal.

11. A system for determining an angle of arrival (AoA) of a radio frequency (RF) signal received at an antenna array, the system comprising:
an antenna array having at least a first antenna pair and a second antenna pair, the antenna array being configured to receive an RF signal at each pair of antennas of the antenna array, wherein antennas of the first antenna pair are offset from each other by a first offset angle and antennas of the second antenna pair are offset from each other by a second offset angle;
a combining block configured to combine outputs of the antennas in each antenna pair to produce first sum and difference signals for the first antenna pair and second sum and difference signals for the second antenna pair;
at least one memory device with computer-executable instructions stored thereon; and
at least one processor for executing the computer-executable instructions stored on the at least one memory device, wherein execution of the computer-executable instructions by the at least one processor causes the at least one processor to perform operations comprising:
determining a plurality of theoretical signals to be received at an antenna array having at least a first antenna pair and a second antenna pair;
generating an AoA look-up table for the antenna array based on a plurality of theoretical signals;
calculating a first difference value corresponding to a signal level difference between the first sum signal and the first difference signal;
calculating a second difference value corresponding to a signal level difference between the second sum signal and the second difference signal;
comparing the first and second difference values to theoretical difference values in the AoA look-up table, wherein the theoretical difference values correspond to different AoAs; and
determining a measured AoA of the RF signal based on the comparison of the first and second difference values to the theoretical difference values.

12. The system of claim 11, wherein the first offset angle has a value of +α and the second offset angle has a value of −α.

13. The system of claim 11, wherein generating the AoA look-up table for the antenna array based on the plurality of theoretical signals comprises:
determining a plurality of AoAs for the plurality of theoretical signals;
calculating, for each antenna pair, theoretical sum and difference signals for the plurality of theoretical signals;
calculating, for each antenna pair, the theoretical difference values based on a signal level difference between the theoretical sum signals and the theoretical difference signals; and
recording, in the AoA look-up table, a first theoretical difference value for the first antenna pair and a second theoretical difference value for the second antenna pair for each AoA of the plurality of AoAs.

14. The system of claim 13, wherein the theoretical sum and difference values vary based on a spacing D between the antennas in each antenna pair, the first offset angle, and the second offset angle.

15. The system of claim 14, wherein the values of the spacing D, the first offset angle, and the second offset angle are selected such that each AoA of the plurality of AoAs has a unique pair of first and second theoretical difference values in the AoA lookup table.

16. The system of claim 13, wherein the plurality of AoAs for the plurality of theoretical signals are in steps of n degrees from 0 to 360-n degrees.

17. The system of claim 16, wherein determining the measured AoA of the RF signal based on the comparison of the first and second difference values to the theoretical difference values comprises selecting first and second theoretical difference values in the lookup table that are closest to the first and second difference values.

18. The system of claim 17, wherein identifying first and second theoretical difference values in the lookup table that are closest to the first and second difference values comprises:
calculating a plurality of $R_m$ values:

$$\text{for } m = 0 \text{ to } \left(\frac{360}{n} - 1\right), R_m = |DIFF1_{nm} - DIFF'1| + |DIFF2_{n,m} - DIFF'2|,$$

wherein $DIFF1_{n,m}$ corresponds to the first theoretical difference values in the lookup table, $DIFF2_{n,m}$ corresponds to the second theoretical difference values in the lookup table, DIFF'1 corresponds to the first difference value, and DIFF'2 corresponds to the second difference value;
determining a minimum value for $R_m$ from the plurality of $R_m$ values; and
selecting the first and second theoretical difference values corresponding to the minimum value for $R_m$ as the closest to the first and second difference values.

19. The system of claim 17, wherein the AoA associated with the selected first and second theoretical difference values from the lookup table is used as the measured AoA for the RF signal.

20. The system of claim 17, wherein a plurality of AoAs associated with the selected first and second theoretical difference values from the lookup table are averaged, and the average AoA value is used as the measured AoA for the RF signal.

* * * * *